US012803910B2

(12) United States Patent
Shen et al.

(10) Patent No.: US 12,803,910 B2
(45) Date of Patent: Nov. 17, 2026

(54) ROUTE SELECTION METHOD AND APPARATUS FOR EDGE APPLICATION SERVER, COMMUNICATION DEVICE AND STORAGE MEDIUM

(71) Applicant: Beijing Xiaomi Mobile Software Co., Ltd., Beijing (CN)

(72) Inventors: Yang Shen, Beijing (CN); Jianfeng Qi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 304 days.

(21) Appl. No.: 18/702,184

(22) PCT Filed: Oct. 18, 2021

(86) PCT No.: PCT/CN2021/124491

§ 371 (c)(1),
(2) Date: Apr. 17, 2024

(87) PCT Pub. No.: WO2023/065081

PCT Pub. Date: Apr. 27, 2023

(65) Prior Publication Data

US 2025/0240241 A1 Jul. 24, 2025

(51) Int. Cl.
*H04L 45/745* (2022.01)
*H04L 61/4511* (2022.01)

(52) U.S. Cl.
CPC ........ *H04L 45/745* (2013.01); *H04L 61/4511* (2022.05)

(58) Field of Classification Search
CPC ... H04L 45/74; H04L 45/745; H04L 61/4511; H04L 67/1001; H04L 67/1004; H04L 67/1021; H04W 76/11; H04W 48/16; H04W 8/26
See application file for complete search history.

(56) References Cited

U.S. PATENT DOCUMENTS

2021/0307018 A1* 9/2021 Qaisrani ................ H04W 4/50
2022/0182358 A1 6/2022 Xiong
2022/0330128 A1* 10/2022 Kim ..................... H04W 40/02
(Continued)

FOREIGN PATENT DOCUMENTS

CN 102196052 A 9/2011
CN 111343092 A 6/2020
(Continued)

OTHER PUBLICATIONS

Chinese Office Action issued on Dec. 25, 2025 for Chinese Patent Application No. 202180003414.8.
(Continued)

*Primary Examiner* — Mohamed A Kamara
(74) *Attorney, Agent, or Firm* — Volpe Koenig

(57) ABSTRACT

A route selection method for an Edge Application Server (EAS) is provided, the method is performed by a terminal, and includes: receiving a Domain Name System (DNS) information indication sent by a first network function; executing a DNS policy decision based on the DNS information indication; and sending a DNS query request to a second network function based on the decision, where the DNS query request is used to request the second network function to select an EAS.

15 Claims, 10 Drawing Sheets

(56) References Cited

U.S. PATENT DOCUMENTS

| | | | | |
|---|---|---|---|---|
| 2022/0345442 | A1* | 10/2022 | Lee | H04L 61/4511 |
| 2024/0022541 | A1* | 1/2024 | Lee | H04L 61/4511 |
| 2024/0056415 | A1* | 2/2024 | Tang | H04L 67/10 |
| 2024/0154931 | A1 | 5/2024 | Tonesi et al. | |
| 2024/0171632 | A1* | 5/2024 | Salkintzis | H04L 67/1021 |
| 2024/0179118 | A1* | 5/2024 | Wei | H04L 61/4541 |

FOREIGN PATENT DOCUMENTS

| | | | |
|---|---|---|---|
| CN | 113114651 | A | 7/2021 |
| CN | 113115480 | A | 7/2021 |
| CN | 113132897 | A | 7/2021 |
| CN | 113206894 | A | 8/2021 |
| CN | 114902634 | A | 8/2022 |
| WO | 2020/253626 | A1 | 12/2020 |
| WO | 2021091232 | A1 | 5/2021 |
| WO | 2021176415 | A1 | 9/2021 |

OTHER PUBLICATIONS

Lenovo, Motorola Mobility, Tencent, "UE handling of DNS configuration via NAS PCO", S2-2107670, 3GPP TSG-SA WG2 Meeting #147E E-Meeting, Oct. 17-22, 2021, 10 pages.

Lenovo, Motorola Mobility, "UE handling of DNS configuration via DHCP RDNSS option", S2-2107671 revision of S2-210xxxx, 3GPP TSG-SA WG2 Meeting #147E E-Meeting, Oct. 17-22, 2021, 11 pages.

Qualcomm Incorporated, Verizon, Vodafone, AT&T, "EAS rediscovery: DNS setting enforcement and notification of change of DNS settings", S2-2104675 was S2-2102680, Sa WG2 Meeting #145E e-meeting, Elbonia, May 17-28, 2021, 13 pages.

Xiaomi, "UE DNS Query using EASDF's IP address", S2-2107731, 3GPP TSG-SA WG2 Meeting #147E E-Meeting, Oct. 18-22, 2021, 8 pages.

ISA State Intellectual Property Office of the People's Republic of China, International Search Report Issued in Application No. PCT/CN2021/124491, Jul. 13, 2022, WIPO, 4 pages.

Ericsson, Qualcomm Incorporated. "KI#1, Way Forward: Distributed Anchor connectivity model", 3GPP TSG-SA WG2 Meeting #140e S2-2004949, Sep. 2, 2020, 6 pages.

3GPP TS 23.501 V17.2.0.,Sep. 2021, 542 pages.

3GPP TS 23.502 V17.2.1,Sep. 2021, 712 pages.

3GPP TS 23.548 V17.0.0,Sep. 2021, 58 pages.

Qualcomm Incorporated, "Issues with DNS based EAS (re-)discovery: solution", S2-2102680, SA WG2 Meeting #144E e-meeting, Elbonia, Apr. 12-16, 2021, 2 pages.

* cited by examiner

ROUTE SELECTION METHOD AND APPARATUS FOR EDGE APPLICATION SERVER, COMMUNICATION DEVICE AND STORAGE MEDIUM

CROSS-REFERENCE TO RELATED APPLICATION

The present application is a U.S. National Stage of International Application No. PCT/CN2021/124491, filed on Oct. 18, 2021, the contents of which are incorporated herein by reference in their entirety for all purposes.

TECHNICAL FIELD

The present disclosure relates to, but is not limited to, the field of wireless communication technologies, and in particular, to route selection methods and apparatuses for an Edge Application Server (EAS), communication devices, and storage media.

BACKGROUND

With the development of mobile communication technologies, there are requirements to meet the communication demands between people and things, and between things and things. High network latency cannot meet the requirements of service scenarios such as Internet of Vehicles, industrial control, augmented reality, or virtual reality. Lower processing latency and higher processing power are required for a network. It needs to provide data processing capabilities and services at an edge of the network, which is close to the data generation. 5G edge computing is a combination of edge infrastructure, edge networks, edge computing platforms, and edge applications, which can satisfy the above requirements.

In related art, it is necessary to select an appropriate Edge Application Server (EAS) to provide high-quality edge computing services.

SUMMARY

Embodiments of the present disclosure disclose route selection methods and apparatuses for an EAS, communication devices, and storage media.

According to a first aspect of an embodiment of the present disclosure, a route selection method for an EAS is provided, which is performed by a terminal, and the method includes:

- receiving a Domain Name System (DNS) information indication sent by a first network function;
- executing a DNS policy decision based on the DNS information indication; and sending a DNS query request to a second network function based on the decision, wherein the DNS query request is used to request the second network function to select an EAS.

In an example, the DNS information indication indicates at least one of: a network slice identifier; a network slice type; a Data Network Name (DNN); a combined relationship between the DNN and the network slice identifier; one or more service characteristics and/or one or more regional locations corresponding to the DNN; or one or more service characteristics and/or one or more regional locations corresponding to the network slice.

In an example, the network slice type is a network slice type determined based on a characteristic of an edge computing application.

In an example, the policy decision comprises at least one of: a first decision instructing the terminal to prioritize a transmission of a DNS query request provided by the first network function, wherein an address indicated by the DNS query request provided by the first network function is an address of the second network function; a second decision instructing the terminal to prioritize a transmission of a DNS query request locally configured by the terminal, wherein an address indicated by the DNS query request locally configured by the terminal is a DNS address locally configured by the terminal; or a third decision instructing the terminal to send a self-determined DNS query request, wherein the DNS query request comprises the DNS query request provided by the first network function or the DNS query request locally configured by the terminal.

In an example, the method further includes: receiving Internet Protocol (IP) address information of the second network function sent by the first network function, wherein the IP address information of the second network function indicates an IP address of the second network function.

In an example, receiving the IP address information of the second network function sent by the first network function comprises: during a process of establishing a Packet Date Unit (PDU) session, receiving a PDU session establishment accept message carrying the IP address information.

In an example, the IP address information of the second network function is determined by EAS deployment information.

In an example, the method further includes: sending the IP address information to an upper layer application of the terminal; and receiving a DNS query request for the IP address information sent by the upper layer application.

In an example, sending the DNS query request to the second network function comprises: sending the DNS query request to the second network function indicated by the IP address information.

According to a second aspect of an embodiment of the present disclosure, a route selection method for an EAS is provided, which is performed by a first network function, and the method includes: sending a DNS information indication to a terminal, wherein the DNS information indication is used for the terminal to execute a DNS policy decision, and the decision is used to determine a DNS query request requesting a second network function to select an EAS In an example, the DNS information indication indicates at least one of: a network slice identifier; a network slice type; a Data Network Name (DNN); a combined relationship between the DNN and the network slice identifier; one or more service characteristics and/or one or more regional locations corresponding to the DNN; or one or more service characteristics and/or one or more regional locations corresponding to the network slice.

In an example, the network slice type is a network slice type determined based on a characteristic of an edge computing application.

In an example, the policy decision comprises at least one of: a first decision instructing the terminal to prioritize a transmission of a DNS query request provided by the first network function, wherein an address indicated by the DNS query request provided by the first network function is an address of the second network function; a second decision instructing the terminal to prioritize a transmission of a DNS query request locally configured by the terminal, wherein an address indicated by the DNS query request locally configured by the terminal is a DNS address locally configured by the terminal; or a third decision instructing the terminal to send a self-determined DNS query request, wherein the DNS query request comprises the DNS query request provided by the first network function or the DNS query request locally configured by the terminal.

In an example, the method further includes: sending IP address information of the second network function determined by the first network function to the terminal, wherein the IP address information of the second network function indicates an IP address of the second network function.

In an example, sending the IP address information of the second network function determined by the first network function to the terminal comprises: during a process of establishing a PDU session, sending a PDU session establishment accept message carrying the IP address information is sent to the terminal.

In an example, the method further includes: determining the second network function based on EAS deployment information determined by a Policy Control Function (PCF) Packet Data Unit (PDU) session policy;

or determining the second network function based on pre-configured EAS deployment information contracted by the terminal.

In an example, the method further includes: obtaining the policy decision; and executing a DNS update reporting operation or a DNS query request redirection operation based on the policy decision and an operator policy.

In an example, the operator policy comprises: in response to determining that an address indicated by a DNS query request determined by the first network function is different from an address indicated by IP address information of the second network function sent from the first network function to the terminal, executing the DNS update reporting operation or the DNS query request redirection operation based on predetermined information.

In an example, the predetermined information comprises at least one of: network status information; DNS priority information; or service characteristic information.

In an example, the method further includes: in response to determining that a DNS update notification has been subscribed and that an address indicated by a DNS query request determined by the first network function is different from an address indicated by IP address information of the second network function sent from the first network function to the terminal, executing a subscription report operation.

In an example, the method further includes: in response to determining that the operator policy indicates a requirement of executing DNS query request redirection and that an address indicated by a DNS query request determined by the first network function is different from an address indicated by IP address information of the second network function sent from the first network function to the terminal, executing the DNS query request redirection operation and sending a DNS query request determined by the first network function to the second network function.

According to a third aspect of an embodiment of the present disclosure, a route selection method for an EAS is provided, which is performed by a second network function, and the method includes: receiving a DNS query request, wherein the DNS query request is determined by a terminal based on a DNS information indication sent by a network function; and selecting an EAS based on the DNS query request.

According to a fourth aspect of an embodiment of the present disclosure, a route selection apparatus for an EAS is provided, and the apparatus includes: a receiving module configured to receive a Domain Name System (DNS) information indication sent by a first network function; a decision module configured to execute a DNS policy decision based on the DNS information indication, so as to obtain the decision; and a sending module configured to send a DNS query request to a second network function based on the decision, wherein the DNS query request is used to request the second network function to select an EAS.

According to a fifth aspect of an embodiment of the present disclosure, a route selection apparatus for an EAS is provided, and the apparatus includes: a sending module configured to send a DNS information indication to a terminal, wherein the DNS information indication is used for the terminal to execute a DNS policy decision, and the decision is used to determine a DNS query request requesting a second network function to select an EAS.

According to a sixth aspect of an embodiment of the present disclosure, a route selection apparatus for an EAS is provided, and the apparatus includes: a receiving module configured to receive a DNS query request, wherein the DNS query request is determined by a terminal based on a DNS information indication sent by a network function; and a selecting module configured to select an EAS based on the DNS query request.

According to a seventh aspect of an embodiment of the present disclosure, a communication device is provided, and the device includes: a processor, and a memory for storing processor-executable instructions; where the processor is configured to implement the method according to any embodiment of the present disclosure when the executable instructions are executed.

According to an eighth aspect of an embodiment of the present disclosure, a computer storage medium is provided, storing a computer-executable program which, when executed by a processor, implements the method according to any embodiment of the present disclosure.

DETAILED DESCRIPTION

Exemplary embodiments will be described in detail here, examples of which are illustrated in the accompanying drawings. When the following description relates to the accompanying drawings, unless specified otherwise, the same numerals in different accompanying drawings represent the same or similar elements. The embodiments described in the following exemplary embodiments do not represent all implementations consistent with embodiments of the present disclosure. Rather, they are merely examples of apparatuses and methods consistent with some aspects of embodiments of the present disclosure as detailed in the appended claims.

The terms used in the embodiments of the present disclosure are for the purpose of describing particular embodiments only, and are not intended to limit the embodiments of the present disclosure. The singular forms such as "a", "the" and "the" used in the embodiments of the present disclosure and the appended claims are also intended to include multiple, unless the context clearly indicates otherwise. It should also be understood that the term "and/or" used herein includes any and all possible combinations of one or more of the associated listed items.

It should be understood that although different information may be described using the terms such as "first," "second," "third," etc. in the present disclosure, the information should not be limited to these terms. These terms are used to distinguish one category of information from another. For example, the first information may also be referred to as the second information without departing from the scope of the present disclosure, and similarly, the second information may also be referred to as the first information. Depending on the context, the word "if" as used herein may be interpreted as "when" or "upon" or "in response to determining".

For the sake of conciseness and easy understanding, the term "greater than" or "less than" is used in this paper to represent the relationship between size. However, it is understood by those skilled in the art that the term "greater than" also covers the meaning of "greater than or equal to", and "less than" also covers the meaning of "less than or equal to".

Figure 1:
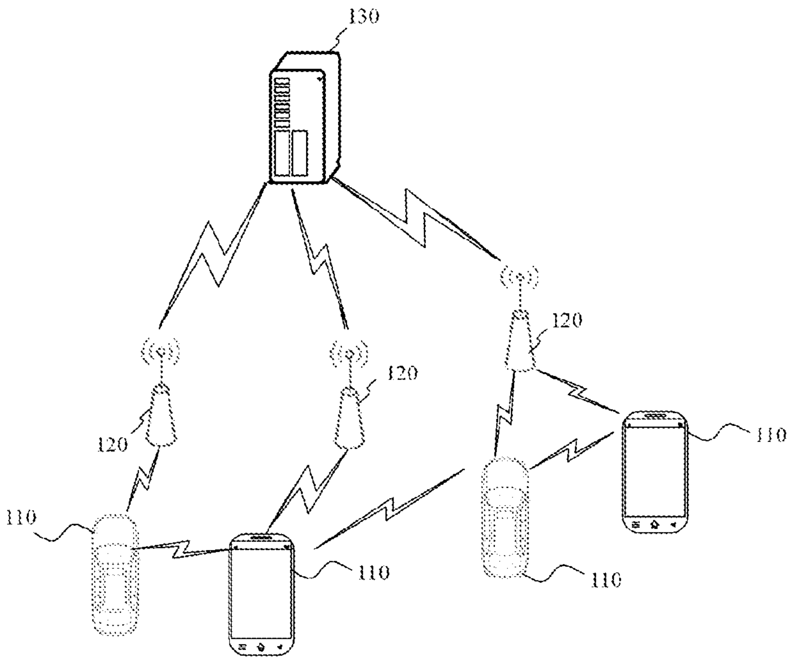
FIG. 1 is a schematic structural diagram of a wireless communication system according to an exemplary embodiment.

Please refer to FIG. 1, which shows a schematic structural diagram of a wireless communication system according to an embodiment of the present disclosure. As shown in FIG. 1, the wireless communication system is a communication system based on mobile communication technology, which may include several user equipment 110 and several base stations 120.

The user equipment 110 may be a device that provides voice and/or data connectivity to users. The user equipment 110 can communicate with one or more core networks via a radio access network (RAN). The user equipment 110 can be an Internet of Things user equipment, such as a sensor device, a mobile phone, and a computer with an Internet of Things user equipment. For example, it can be a fixed, portable, pocket-sized, handheld, computer-built, or vehicle-mounted apparatus. For example, a Station (STA), a subscriber unit, a subscriber station, a mobile station, a mobile, a remote station, an access point, a remote terminal, an access terminal, a user terminal, a user agent, a user device, or user equipment. Or, the user equipment 110 may also be a device of an unmanned aerial vehicle. Or, the user equipment 110 may also be a vehicle-mounted equipment, for example, a driving computer with a wireless communication function, or a wireless user equipment with an external driving computer. Or, the user equipment 110 may also be a roadside device, such as a street lamp, a signal lamp, or other roadside device with a wireless communication function.

The base station 120 may be a network-side device in a wireless communication system. The wireless communication system can be a 4th generation mobile communication (4G) system, also known as a long term evolution (LTE) system. Or, the wireless communication system can also be a 5G system, also known as a new radio system or a 5G NR system. Or, the wireless communication system can also be a next generation system of the 5G system. An access network in the 5G system can be called new generation-radio access network (NG-RAN).

The base station 120 may be an evolved base station (eNB) adopted in the 4G system. Or, the base station 120 may also be a base station (gNB) adopting a centralized and distributed architecture in the 5G system. When the base station 120 adopts a centralized and distributed architecture, it usually includes a central unit (CU) and at least two distributed units (DUs). A protocol stack of packet data convergence protocol (PDCP) layer, radio link control protocol (RLC) layer and media access control (MAC) layer is provided in the central unit; a protocol stack for a physical (PHY) layer is provided in the distributed unit, and embodiments of the present disclosure do not limit the specific implementation of the base station 120.

A wireless connection can be established between the base station 120 and the user equipment 110 through an air interface. In different implementations, the air interface is an air interface based on the fourth generation mobile communication network technology (4G) standard; or the air interface is an air interface based on the fifth generation mobile communication network technology (5G) standard, for example, the air interface is a new radio; or, the air interface can also be an air interface based on a technical standard of a next generation mobile communication network of 5G.

In some embodiments, an E2E (End to End) connection can also be established between the user equipment 110. For example, scenarios of vehicle to vehicle (V2V) communication, vehicle to Infrastructure (V2I) communication and vehicle to pedestrian (V2P) communication in vehicle to everything (V2X) communication.

The user equipment can be considered as a terminal device of the following embodiments.

In some embodiments, the wireless communication system may further include a network management device 130.

In order to facilitate the understanding of those skilled in the art, the embodiments of the present disclosure list a plurality of embodiments to clearly explain the technical solution of the embodiments of the present disclosure. Those skilled in the art can understand that the embodiments provided by the embodiments of the present disclosure can be executed alone, combined with the methods of other embodiments of the embodiments of the present disclosure, or together with some methods of other related technologies; the embodiments of the present disclosure do not limit this.

In order to better understand the technical solutions disclosed in embodiments of the present disclosure, application scenarios of edge computing are illustrated through exemplary application scenarios.

In a scenario embodiment, edge computing supports that operator services or third-party application services are deployed close to an access point near a network where the UE is located, thereby enabling efficient service delivery by reducing end-to-end latency and load on a transport network.

In a scenario embodiment, 5G edge computing is a combination of edge infrastructure, edge network, edge computing platform, and edge applications. The User Plane Function (UPF) serves as an interface anchor to collaborate with the 5G core networks, edge computing platforms, and terminals, so as to fulfill functions in the 5G edge computing scenarios. The interaction of a Session Management Function (SMF), the UPF and a Policy Control Function (PCF) realizes the branching and policy functions of 5G edge computing. A unified capability exposure node (e.g., the network exposure function, NEF) is responsible for the interaction between external edge applications and the 5G network. The edge computing platform may act as an Application Function (AF) in the 5G network, and manages sessions and policies through the NEF/PCF-SMF-UPF. Edge application(s) deployed on the edge computing platform can belong to one or more network slices.

In a scenario implementation, an Edge Hosting Environment (EHE) is supported to deploy in a Data Network (DN) outside a session anchor UPF. The EHE may be under the control of an operator or a third party. A local deployment deploying an EHE network may have user-plane connections to both a centrally deployed protocol data unit session anchor UPF and a locally deployed protocol data unit session anchor UPF in the same data network. 3GPP 5G networks support an EAS Discovery Function (EASDF). The EASDF has a user-plane connection with the protocol data unit session anchor point UPF, and processes Domain Name System (DNS) message(s) according to SMF instructions for transmitting DNS signaling with the UE.

In an embodiment, an edge application service may be provided by EASs. To start the edge application service, a terminal (e.g., UE) needs to know an Internet Protocol (IP) address of the application server. The UE may select a suitable EAS (e.g., an EAS that is closest to the UE) via the EASDF, so that data flow(s) can be routed from local to the EAS, thereby optimizing the service latency, the data routing path, and the user service experience.

In an embodiment, EAS discovery is a process by which the UE discovers a suitable EAS IP address via DNS. 3GPP supports EAS discovery and re-discovery functions. EAS re-discovery is a process of discovering and selecting an EAS again when a previous EAS is not available or is no longer an optimal EAS. A DNS server may be deployed at different locations in the network. It can be deployed as a central DNS resolver/server, or as a local DNS resolver/server.

However, in the DNS query for edge computing application services, how to ensure the preference of an EAS, so as to ensure that the UE discovers an optimal EAS by using the EASDF provided by the network, thereby truly optimizing the service latency, the data routing path, and the user service experience, is still a problem to be solved.

Figure 2:
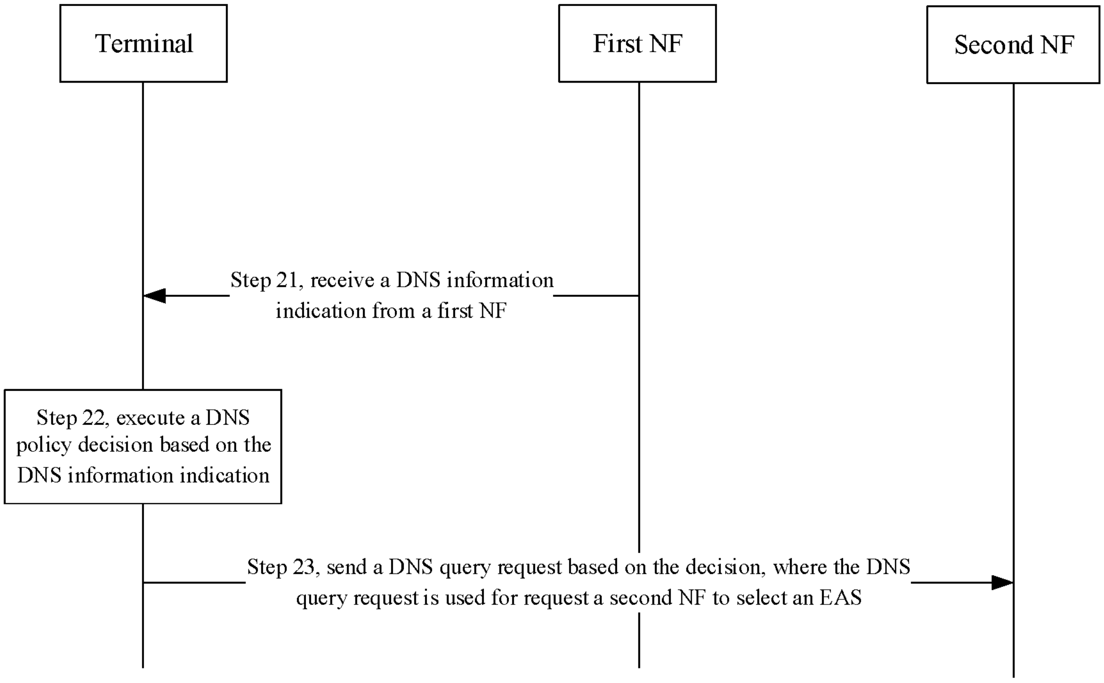
FIG. 2 is a flowchart of a route selection method for an EAS according to an exemplary embodiment.

As shown in FIG. 2, a route selection method for an EAS is provided in this embodiment, where the method is performed by a terminal, and the method includes the following.

At step 21, a Domain Name System (DNS) information indication from a first network function (First NF) is received.

At step 22, a DNS policy decision is executed based on the DNS information indication.

At step 23, a DNS query request is sent to a second network function based on the decision, where the DNS query request is used to request the second network function (Second NF) to select the EAS.

The terminal may include, but is not limited to, a cell phone, a tablet, a wearable device, a vehicle terminal, a Road Side Unit (RSU), a smart home terminal, an industrial sensing device, a medical device, and the like. For example, the smart home terminal may include a camera, a temperature acquisition device, a brightness acquisition device, and the like.

The base station to which the present disclosure relates may include various types of base stations, such as, a base station of a third-generation mobile communication (3G) network, a base station of a fourth-generation mobile communication (4G) network, a base station of a fifth-generation mobile communication (5G) network, or other evolutionary base stations.

The core network device to which the present disclosure relates may include a Network Function (NF) entity or the like. For example, it may be a Session Management Function (SMF), an Access and Mobility Management Function (AMF), etc. The first network function may be the SMF and the second network function may be the EASDF.

In some embodiments, executing the DNS policy decision may include: determining to prioritize a transmission of a DNS query request provided by the first network function, where an address indicated by the DNS query request provided by the first network function is an address of the second network function; determining to prioritize a transmission of a DNS query request locally configured by the terminal, where an address indicated by the DNS query request locally configured by the terminal is a DNS address locally configured by the terminal; or determining a transmission of a self-determined DNS query request, where the self-determined DNS query request includes the DNS query request provided by the first network function or the DNS query request locally configured by the terminal.

In an embodiment, the DNS information indication sent by the first network function is received, where the DNS information indication includes an indication that a created PDU session is a specific service session of an edge computing type. The DNS policy decision is executed based on the DNS information indication, so as to determine to prioritize the transmission of the DNS query request provided by the first network function, where the address indicated by the DNS query request provided by the first network function is the address of the second network function. The DNS query request provided by the first network function is sent to the second network function, where the DNS query request is used to request the second network function to select an EAS.

In an embodiment, the DNS information indication sent by the first network function is received, where the DNS information indication includes an indication that a created PDU session is a specific service session of an edge computing type. The DNS policy decision is executed based on the DNS information indication, so as to determine the priority for transmission of the DNS query request set locally by the terminal, where the address indicated by the DNS query request set locally by the terminal is the DNS address set locally by the terminal. The DNS query request locally configured by the terminal is sent to the second network function, where the DNS query request is used to request the second network function to select an EAS.

In an embodiment, the DNS information indication from the first network function is received, where the DNS information indication includes an indication that a created PDU session is a specific service session of an edge computing type. The DNS policy decision is executed based on the DNS information indication, so as to determine the transmission of the self-determined DNS query request, where the DNS query request includes the DNS query request provided by the first network function or the DNS query request locally set by the terminal. One of the above two DNS query requests may be randomly selected to be sent to the second network function, where the DNS query request is used to request the second network function to select an EAS.

In an embodiment, the DNS information indication from the first network function is received, where the DNS information indication includes an indication that a created PDU session is a specific service session of an edge computing type. The DNS policy decision is executed based on the DNS information indication, so as to determine the transmission of the self-determined DNS query request, where the DNS query request includes the DNS query request provided by the first network function or the DNS query request locally set by the terminal. One of the above two DNS query requests may be randomly selected to be sent to the second network function, where the DNS query request is used to request the second network function to select an EAS.

In an embodiment, the DNS information indication includes a Data Network Name (DNN) and a network slice type, then the terminal may determine whether the PDU session is the specific service session of the edge computing type based on the DNN and the network slice type.

In an embodiment, the DNS information indication and IP address information of the second network function, which are sent by the first network function, are received. The DNS policy decision is made based on the DNS information indication. Based on the decision, a DNS query request is sent to a second network function indicated by the IP address information, where the DNS query request is used to request the second network function to select an EAS. In an embodiment, the IP address information may be carried in a PDU session establishment accept message. It is noted that both the DNS information indication and the IP address information may be carried in the PDU session establishment accept message. After receiving the IP address information, the terminal may configure the second network function indicated by the address information as a DNS server or a proxy DNS server for the PDU session.

The first network function may select a second network function from a plurality of second network functions and send IP address information of the selected second network function to the terminal. In an embodiment, the first network function may select the second network function based on EAS deployment information of the terminal. In an embodiment, the first network function may determine EAS deployment information based on a PCF PDU session policy. In another embodiment, the first network function may also determine the EAS deployment information based on contract information of the terminal. The second network function may be an EASDF.

In an embodiment, IP address information of the second network function sent by the first network function is received. The IP address information is sent to an upper layer application or service of the terminal. The upper layer application or service performs a DNS policy decision based on the DNS information indication, and determines a DNS query request. The determined DNS query request is sent to the second network function indicated by the IP address information. It is noted that the method in this embodiment may be realized by a DNS client function of the terminal. The DNS client function of the terminal may be implemented by a terminal application layer interface, or may be implemented by a terminal operating system, or may be implemented in terminal hardware. When the DNS client function of the terminal is realized in the UE hardware, the method is realized by the hardware and the operating system jointly.

In an embodiment of the present disclosure, a DNS information indication sent by the first network function is received, a DNS policy decision is executed based on the DNS information indication, and based on the decision, a DNS query request is sent to the second network function, where the DNS query request requests the second network function to select an EAS. Since the terminal performs the DNS policy decision based on the DNS information indication, the decision can be adapted to the first network function's requirement for DNS. In this way, a suitable DNS query request can be sent to a second network function requesting the second network function to select a suitable EAS, thereby enabling the provision of a quality edge computing service.

It is to be noted that a person skilled in the art may understand that a method provided by the embodiment(s) of the present disclosure may be executed alone or together with method(s) in the embodiment(s) of the present disclosure or method(s) in the related art.

In an embodiment, the DNS information indication indicates at least one of the following: a network slice identifier; a network slice type; a DNN; a combined relationship between the DNN and the network slice identifier; one or more service characteristics and/or one or more regional locations corresponding to the DNN; or one or more service characteristics and/or one or more regional locations corresponding to the network slice.

The network slice type is a network slice type determined based on a characteristic of an edge computing application.

The service characteristic(s) may be characteristic(s) associated with the edge computing application, for example, characteristics such as latency and wireless communication quality.

In an embodiment, the policy decision includes at least one of the following: a first decision instructing the terminal to prioritize a transmission of a DNS query request provided by the first network function, where an address indicated by the DNS query request provided by the first network function is an address of the second network function; a second decision instructing the terminal to prioritize a transmission of a DNS query request locally configured by the terminal, where an address indicated by the DNS query request locally configured by the terminal is a DNS address locally configured by the terminal; or a third decision instructing the terminal to send a self-determined DNS query request, where the DNS query request includes the DNS query request provided by the first network function or the DNS query request locally configured by the terminal.

In an embodiment, in response to the terminal executing the first decision based on the DNS information indication, the terminal determines to prioritize sending the DNS query request provided by the first network function, where the address indicated by the DNS query request provided by the first network function is the address of the second network function.

In an embodiment, in response to the terminal executing the second decision based on the DNS information indication, the terminal determines to prioritize sending the DNS query request locally set by the terminal, where the address indicated by the DNS query request locally set by the terminal is the DNS address locally set by the terminal.

In an embodiment, in response to the terminal executing the third decision based on the DNS information indication, the terminal determines the DNS query request to be sent on its own, where the DNS query request includes: the DNS query request provided by the first network function or the DNS query request set locally by the terminal. It is noted that determining the transmission of the self-determined DNS query request includes: determining to randomly select one of the DNS query requests provided by the first network function and the DNS query request locally configured by the terminal to be sent.

It is noted that the policy decision may be determined based on requirements, and may include, but is not limited to, the aforementioned policy decisions.

Figure 3:
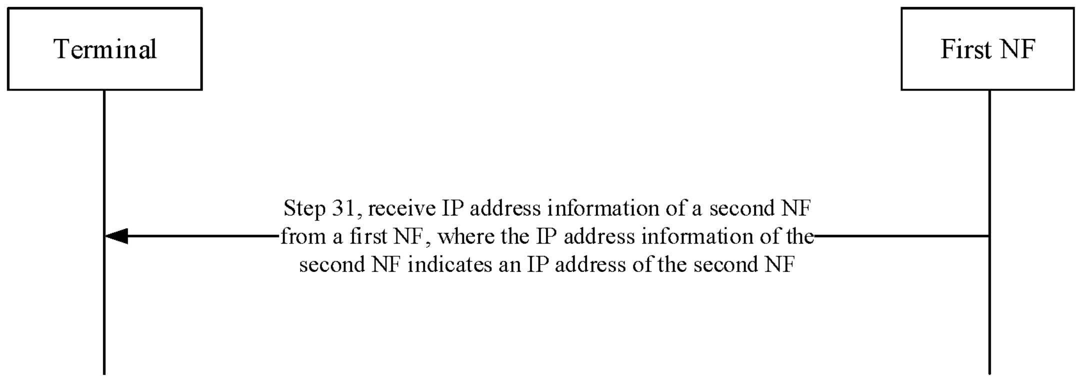
FIG. 3 is a flowchart of a route selection method for an EAS according to an exemplary embodiment.

As shown in FIG. 3, a route selection method for an EAS is provided in this embodiment, where the method is performed by a terminal, and the method includes the following.

At step 31, IP address information of a second network function sent by a first network function is received, where the IP address information of the second network function indicates an IP address of the second network function.

In an embodiment, the first network function may select a second network function from multiple second network functions and send the IP address information of the selected second network function to the terminal. In an embodiment, the first network function may select the second network function based on EAS deployment information of the terminal. In an embodiment, the first network function may determine EAS deployment information based on a PCF PDU session policy. In another embodiment, the first network function may also determine the EAS deployment information based on contract information of the terminal. The second network function can be an EASDF.

In an embodiment, IP address information of the second network function sent by the first network function is received. The IP address information is sent to an upper layer application or service of the terminal. The upper layer application or service performs a DNS policy decision based on the DNS information indication, and determines a DNS query request. The determined DNS query request is sent to the second network function indicated by the IP address information. It is noted that the method in this embodiment may be realized by a DNS client function of the terminal. The DNS client function of the terminal may be implemented by an application layer interface of the terminal, or may be implemented by an operating system of the terminal, or may be implemented in hardware of the terminal. When the DNS client function of the terminal is realized in the UE hardware, the method is realized and supported by both the hardware and the operating system.

It is to be noted that a person skilled in the art may understand that a method provided by the embodiment(s) of the present disclosure may be executed alone or together with method(s) in the embodiment(s) of the present disclosure or method(s) in the related art.

Figure 4:
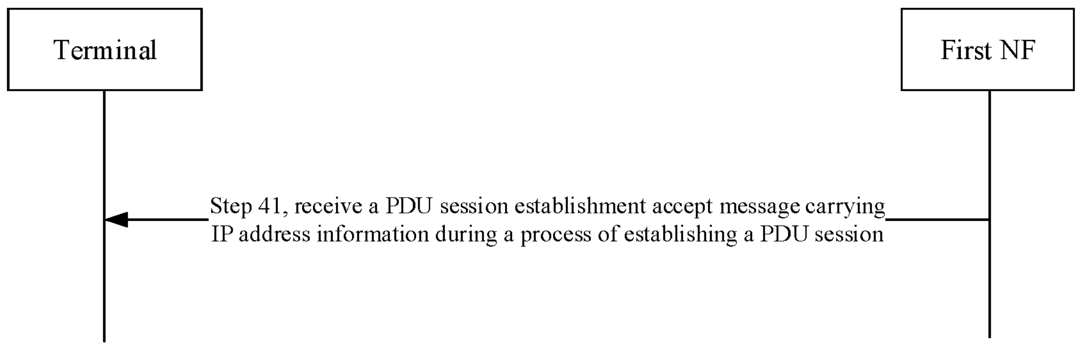
FIG. 4 is a flowchart of a route selection method for an EAS according to an exemplary embodiment.

As shown in FIG. 4, a route selection method for an EAS is provided in this embodiment, where the method is performed by a terminal, and the method includes the following.

At step 41, during a process of establishing a Packet Data Unit (PDU) session, a PDU session establishment accept message carrying IP address information is received.

In an embodiment, the terminal receives the DNS information indication and IP address information of the second network function sent by the first network function and carried in the PDU session establishment accept message. The DNS policy decision is executed based on the DNS information indication. Based on the decision, the terminal sends a DNS query request to a second network function indicated by the IP address information, where the DNS query request is used to request the second network function to select an EAS. It is noted that both the DNS information indication and the IP address information may be carried in the PDU session establishment accept message. After receiving the IP address information, the terminal may configure the second network function indicated by the address information as a DNS server or a proxy DNS server for the PDU session.

It is to be noted that a person skilled in the art may understand that a method provided by the embodiment(s) of the present disclosure may be executed alone or together with method(s) in the embodiment(s) of the present disclosure or method(s) in the related art.

In an embodiment, the IP address information of the second network function is determined based on EAS deployment information.

In an embodiment, the first network function determines the second network function based on EAS deployment information determined by the policy control function (PCF) PDU session policy.

In an embodiment, the first network function determines the second network function based on pre-configured EAS deployment information contracted by the terminal.

Figure 5:
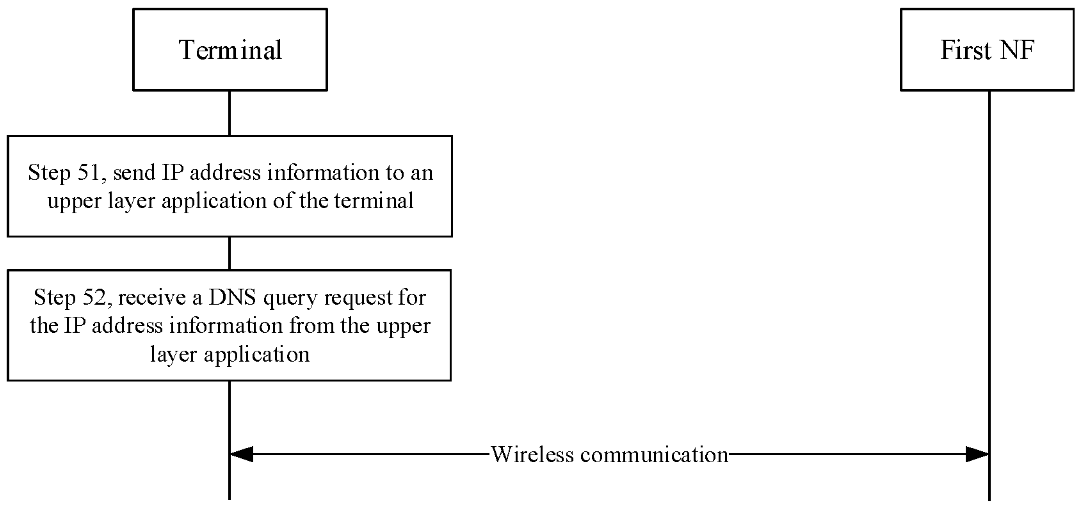
FIG. 5 is a flowchart of a route selection method for an EAS according to an exemplary embodiment.

As shown in FIG. 5, a route selection method for an EAS is provided in this embodiment, where the method is performed by a terminal, and the method includes the following.

At step 51, IP address information is sent to an upper layer application of the terminal.

At step 52, a DNS query request for the IP address information sent by the upper layer application is received.

In an embodiment, IP address information of the second network function sent by the first network function is received. The IP address information is sent to the upper layer application or service of the terminal. The upper layer application or service performs a DNS policy decision based on the DNS information indication, and determines a DNS query request. The terminal receives the DNS query request sent by upper layer applications for IP address information, and sends the determined DNS query request to the second network function indicated by the IP address information. It is noted that the method in this embodiment may be realized by a DNS client function of the terminal. The DNS client function of the terminal may be implemented by an application layer interface of the terminal, or may be implemented by an operating system of the terminal, or may be implemented in hardware of the terminal. When the DNS client function of the terminal is realized in the UE hardware, the method is realized and supported by both the hardware and the operating system.

In an embodiment, in response to determining priority for sending a DNS query request provided by the first network function, the DNS query request provided by the first network function is sent to the second network function indicated by the IP address information, where the address indicated by the DNS query request provided by the first network function is the address of the second network function.

In an embodiment, in response to determining priority for sending a DNS query request set locally by the terminal, the DNS query request set locally by the terminal is sent to the second network function indicated by the IP address information, where the address indicated by the DNS query request set locally by the terminal is the DNS address set locally by the terminal.

In an embodiment, in response to determining to send a self-determined DNS query request, a randomly selected DNS query request is sent to the second network function indicated by the IP address information, where the DNS query request is selected from the DNS query request provided by the first network function and the DNS query request set locally by the terminal. The DNS query request includes the DNS query request provided by the first network function or the DNS query request locally configured by the terminal. It should be noted that sending the self-determined DNS query request includes randomly selecting one request from the DNS query request provided by the first network function and the DNS query request set locally by the terminal.

It is to be noted that a person skilled in the art may understand that a method provided by the embodiment(s) of the present disclosure may be executed alone or together with method(s) in the embodiment(s) of the present disclosure or method(s) in the related art.

Figure 6:
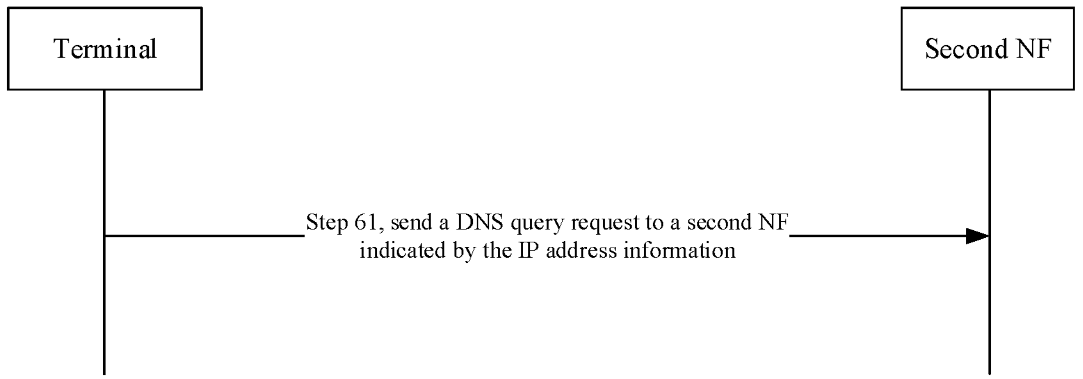
FIG. 6 is a flowchart of a route selection method for an EAS according to an exemplary embodiment.

As shown in FIG. 6, a route selection method for an EAS is provided in this embodiment, where the method is performed by a terminal, and the method includes the following.

At step 61, a DNS query request is sent by a terminal to a second network function indicated by IP address information.

In an embodiment, in response to determining to prioritize a transmission of a DNS query request provided by the first network function, the DNS query request provided by the first network function is sent to the second network function indicated by the IP address information, where an address indicated by the DNS query request provided by the first network function is an address of the second network function.

In an embodiment, in response to determining to prioritize a transmission of a DNS query request set locally by the terminal, the DNS query request set locally by the terminal is sent to the second network function indicated by the IP address information, where the address indicated by the DNS query request set locally by the terminal is the DNS address set locally by the terminal.

In an embodiment, in response to determining a transmission of a self-determined DNS query request, a DNS query request, which is randomly selected from a DNS query request provided by the first network function and a DNS query request set locally by the terminal, is sent to the second network function indicated by the IP address information. The DNS query request includes the DNS query request provided by the first network function or the DNS query request locally configured by the terminal. It should be noted that sending the self-determined DNS query request include randomly selecting one request from the DNS query request provided by the first network function and the DNS query request set locally by the terminal.

It is to be noted that a person skilled in the art may understand that a method provided by the embodiment(s) of the present disclosure may be executed alone or together with method(s) in the embodiment(s) of the present disclosure or method(s) in the related art.

Figure 7:
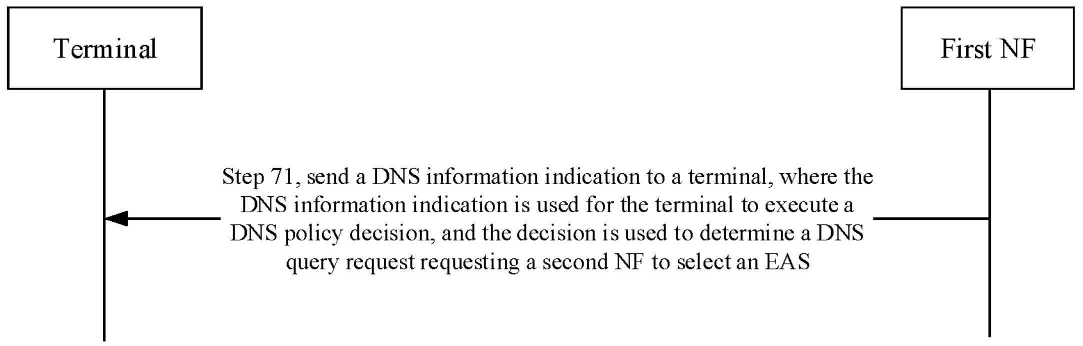
FIG. 7 is a flowchart of a route selection method for an EAS according to an exemplary embodiment.

As shown in FIG. 7, a route selection method for an EAS is provided in this embodiment, where the method is performed by a first network function, and the method includes the following.

At step 71, a DNS information indication is sent to a terminal by a first network function, where the DNS information indication is used by the terminal to execute a DNS policy decision, and the decision is used to determine a DNS query request requesting a second network function to select an EAS.

The terminal may include, but is not limited to, a cell phone, a tablet, a wearable device, a vehicle terminal, a Road Side Unit (RSU), a smart home terminal, an industrial sensing device, a medical device, and the like. For example, the smart home terminal may include a camera, a temperature acquisition device, a brightness acquisition device, and the like.

The base station to which the present disclosure relates may include various types of base stations, such as, a base station of a third-generation mobile communication (3G) network, a base station of a fourth-generation mobile communication (4G) network, a base station of a fifth-generation mobile communication (5G) network, or other evolutionary base stations.

The core network device to which the present disclosure relates may include a Network Function (NF) entity or the like. For example, it may be a Session Management Function (SMF), an Access and Mobility Management Function (AMF), etc. The first network function may be the SMF and the second network function may be the EASDF.

In some embodiments, executing the DNS policy decision may include: determining to prioritize a transmission of a DNS query request provided by the first network function, where an address indicated by the DNS query request provided by the first network function is an address of the second network function; determining to prioritize a transmission of a DNS query request locally configured by the terminal, where an address indicated by the DNS query request locally configured by the terminal is a DNS address locally configured by the terminal; or determining a transmission of a self-determined DNS query request, where the DNS query request includes the DNS query request provided by the first network function or the DNS query request locally configured by the terminal.

In an embodiment, the first network function sends the DNS information indication, where the DNS information indication includes an indication that a created PDU session is a specific service session of an edge computing type. The terminal receives the DNS information indication from the first network function. The terminal executes the DNS policy decision based on the DNS information indication, and determines to prioritize the transmission of the DNS query request provided by the first network function, where the address indicated by the DNS query request provided by the first network function is the address of the second network function. The DNS query request provided by the first network function is sent to the second network function, where the DNS query request is used to request the second network function to select an EAS. The second network function receives the DNS query request.

In an embodiment, the first network function sends the DNS information indication, where the DNS information indication includes an indication that a created PDU session is a specific service session of an edge computing type. The terminal receives the DNS information indication from the first network function. The terminal executes the DNS policy decision based on the DNS information indication, and determines to prioritize the transmission of the DNS query request set locally by the terminal, where the address indicated by the DNS query request set locally by the terminal is the DNS address set locally by the terminal. The DNS query request locally configured by the terminal is sent to the second network function, where the DNS query request is used to request the second network function to select an EAS. The second network function receives the DNS query request.

In an embodiment, the first network function sends the DNS information indication, where the DNS information indication includes an indication that a created PDU session is a specific service session of an edge computing type. The DNS information indication is received from the first network function. The DNS policy decision is executed based on the DNS information indication, and determines a self-sent DNS query request, where the DNS query request includes the DNS query request provided by the first network function or the DNS query request locally set by the terminal. One of the above two DNS query requests may be randomly selected to be sent to the second network function, where the DNS query request is used to request the second network function to select an EAS.

In an embodiment, the first network function sends the DNS information indication, where the DNS information indication includes an indication that a created PDU session is a specific service session of an edge computing type. The terminal receives the DNS information indication from the first network function. The terminal executes the DNS policy decision based on the DNS information indication, and determines a self-sent DNS query request, where the DNS query request includes the DNS query request provided by the first network function or the DNS query request locally set by the terminal. One of the above two DNS query requests may be randomly selected to be sent to the second network function, where the DNS query request is used to request the second network function to select an EAS.

In an embodiment, the DNS information indication includes a DNN and a network slice type, then whether the PDU session is the specific service session of the edge computing type is determined based on the DNN and the network slice type.

In an embodiment, the first network function sends the terminal the DNS information indication and IP address information of the second network function. The DNS policy decision is executed based on the DNS information indication. Based on the decision, the terminal sends a DNS query request to a second network function indicated by the IP address information, where the DNS query request is used to request the second network function to select an EAS. In an embodiment, the IP address information may be carried in a PDU session establishment accept message. It is noted that both the DNS information indication and the IP address information may be carried in the PDU session establishment accept message. After receiving the IP address information, the terminal may configure the second network function indicated by the address information as a DNS server or a proxy DNS server for the PDU session.

The first network function may select a second network function from a plurality of second network functions and send IP address information of the selected second network function to the terminal. In an embodiment, the first network function may select the second network function based on EAS deployment information of the terminal. In an embodiment, the first network function may determine EAS deployment information based on a PCF PDU session policy. In another embodiment, the first network function may also determine the EAS deployment information based on the contract information of the terminal. The second network function may be an EASDF.

In an embodiment, the first network function sends IP address information of the second network function to the terminal. The IP address information is sent to an upper layer application or service of the terminal. The upper layer application or service performs a DNS policy decision based on the DNS information indication, and determines a DNS query request. The determined DNS query request is sent to the second network function indicated by the IP address information. It is noted that the method in this embodiment may be realized by a DNS client function of the terminal. The DNS client function of the terminal may be implemented by a terminal application layer interface, or may be implemented by a terminal operating system, or may be implemented in terminal hardware. When the DNS client function of the terminal is realized in the UE hardware, the method is realized by the hardware and the operating system jointly.

It is to be noted that a person skilled in the art may understand that a method provided by the embodiment(s) of the present disclosure may be executed alone or together with method(s) in the embodiment(s) of the present disclosure or method(s) in the related art.

In an embodiment, the DNS information indication indicates at least one of the following: a network slice identifier; a network slice type; a DNN; a combined relationship between the DNN and the network slice identifier; one or more service characteristics and/or one or more regional locations corresponding to the DNN; or one or more service characteristics and/or one or more regional locations corresponding to the network slice.

The network slice type is a network slice type determined based on a characteristic of the edge computing application.

The service characteristic(s) may be characteristic(s) associated with the edge computing application, for example, characteristics such as latency and wireless communication quality.

In an embodiment, the policy decision includes at least one of the following: a first decision instructing the terminal to prioritize the transmission of the DNS query request provided by the first network function, where the address indicated by the DNS query request provided by the first network function is the address of the second network function; a second decision instructing the terminal to prioritize the transmission of the DNS query request locally configured by the terminal, where the address indicated by the DNS query request locally configured by the terminal is the DNS address locally configured by the terminal; or a third decision instructing the terminal to determine the transmission of the self-determined DNS query request, where the DNS query request includes the DNS query request provided by the first network function or the DNS query request locally configured by the terminal.

In an embodiment, in response to the terminal executing the first decision based on the DNS information indication, the terminal determines to prioritize sending the DNS query request provided by the first network function, where the address indicated by the DNS query request provided by the first network function is the address of the second network function.

In an embodiment, in response to the terminal executing the second decision based on the DNS information indication, the terminal determines to prioritize sending the DNS query request locally set by the terminal, where the address indicated by the DNS query request locally set by the terminal is the DNS address locally set by the terminal.

In an embodiment, in response to the terminal executing the third decision based on the DNS information indication, the terminal determines the DNS query request to be sent on its own, where the DNS query request includes: the DNS query request provided by the first network function or the DNS query request set locally by the terminal. It is noted that determining the transmission of the self-determined DNS query request includes: determining to randomly select one of the DNS query requests provided by the first network function, and the DNS query request locally configured by the terminal to be sent.

It is noted that the policy decision may be determined based on requirements, and may include, but is not limited to, the aforementioned policy decisions.

Figure 8:
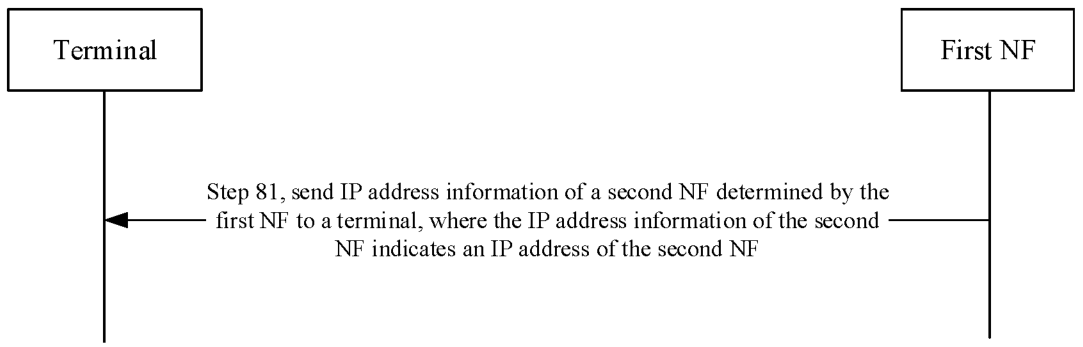
FIG. 8 is a flowchart of a route selection method for an EAS according to an exemplary embodiment.

As shown in FIG. 8, a route selection method for an EAS is provided in this embodiment, where the method is performed by a first network function, and the method includes the following.

At step 81, IP address information of a second network function determined by the first network function is sent to a terminal by the first network function, where the IP address information of the second network function indicates an IP address of the second network function.

In an embodiment, the first network function may select a second network function from multiple second network functions and send IP address information of the selected second network function to the terminal. In an embodiment, the first network function may select the second network function based on EAS deployment information of the terminal. In an embodiment, the first network function may determine EAS deployment information based on a PCF PDU session policy. In another embodiment, the first network function may also determine the EAS deployment information based on contract information of the terminal. The second network function can be an EASDF.

In an embodiment, the first network function sends IP address information of the second network function to the terminal. The terminal sends the IP address information to an upper layer application or service of the terminal. The upper layer application or service performs a DNS policy decision based on the DNS information indication, determines a DNS query request, and sends the determined DNS query request to the terminal. The terminal sends the determined DNS query request to the second network function indicated by the IP address information. The second network function receives the DNS query request. It is noted that the method in this embodiment may be realized by a DNS client function of the terminal. The DNS client function of the terminal may be implemented by an application layer interface of the terminal, or may be implemented by an operating system of the terminal, or may be implemented in hardware of the terminal. When the DNS client function of the terminal is realized in the UE hardware, the method is realized and supported by both the hardware and the operating system.

It is to be noted that a person skilled in the art may understand that a method provided by the embodiment(s) of the present disclosure may be executed alone or together with method(s) in the embodiment(s) of the present disclosure or method(s) in the related art.

Figure 9:
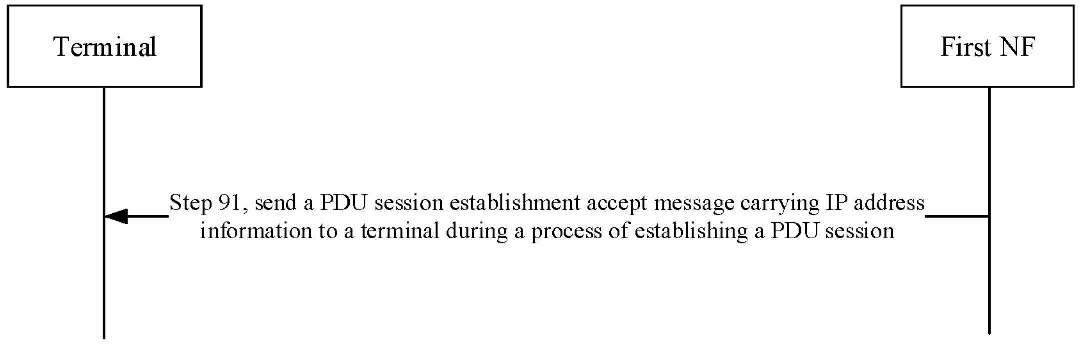
FIG. 9 is a flowchart of a route selection method for an EAS according to an exemplary embodiment.

As shown in FIG. 9, a route selection method for an EAS is provided in this embodiment, where the method is performed by a first network function, and the method includes the following.

At step 91, during a process of establishing a PDU session, a PDU session establishment accept message carrying IP address information is sent to a terminal by a first network function.

In an embodiment, the first network function sends the terminal the PDU session establishment accept message carrying the DNS information indication and IP address information of the second network function. The DNS policy decision is executed based on the DNS information indication. Based on the decision, the terminal sends a DNS query request to a second network function indicated by the IP address information, where the DNS query request is used to request the second network function to select an EAS. It is noted that both the DNS information indication and the IP address information may be carried in the PDU session establishment accept message. After receiving the IP address information, the terminal may configure the second network function indicated by the address information as a DNS server or a proxy DNS server for the PDU session.

It is to be noted that a person skilled in the art may understand that a method provided by the embodiment(s) of the present disclosure may be executed alone or together with method(s) in the embodiment(s) of the present disclosure or method(s) in the related art.

Figure 10:
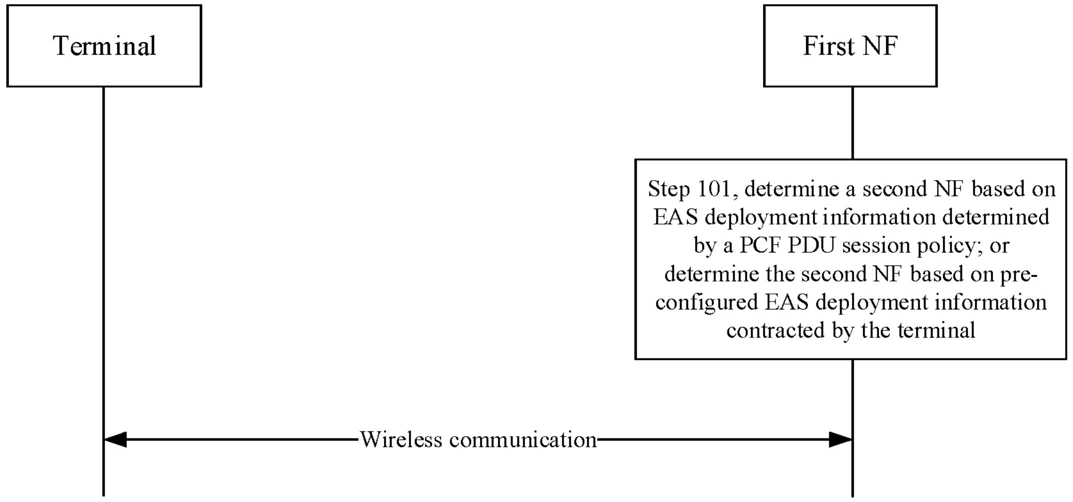
FIG. 10 is a flowchart of a route selection method for an EAS according to an exemplary embodiment.

As shown in FIG. 10, a route selection method for an EAS is provided in this embodiment, where the method is performed by a first network function, and the method includes the following.

At step 101, a second network function is determined by a first network function based on EAS deployment information determined by a PCF PDU session policy;

or, the second network function is determined based on pre-configured EAS deployment information contracted by the terminal.

In an embodiment, the second network function is determined based on the EAS deployment information determined by a PCF PDU session policy, and IP address information of the second network function is sent to the terminal.

In an embodiment, the second network function is determined based on pre-configured EAS deployment information of a terminal contract, and IP address information of the second network function is sent to the terminal.

It is to be noted that a person skilled in the art may understand that a method provided by the embodiment(s) of the present disclosure may be executed alone or together with method(s) in the embodiment(s) of the present disclosure or method(s) in the related art.

Figure 11:
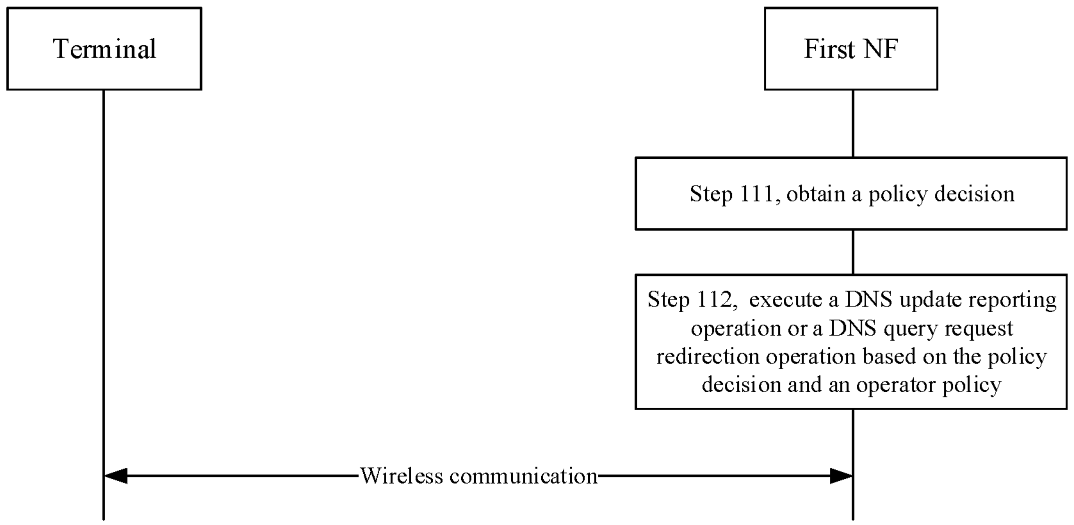
FIG. 11 is a flowchart of a route selection method for an EAS according to an exemplary embodiment.

As shown in FIG. 11, a route selection method for an EAS is provided in this embodiment, where the method is performed by a first network function, and the method includes the following.

At step 111, a policy decision is obtained.

At step 112, a DNS update reporting operation or a DNS query request redirection operation is executed based on the policy decision and an operator policy.

The operator policy can include: in response to determining that an address indicated by a DNS query request determined by the first network function is different from an address indicated by IP address information of the second network function sent from the first network function to the terminal, executing the DNS update reporting operation or the DNS query request redirection operation based on predetermined information.

In an embodiment, the predetermined information includes at least one of the following: network status information; DNS priority information; or service characteristic information.

In an embodiment, the first network function can obtain the policy decision of the terminal. If the policy decision is the second decision, which instructs the terminal to prioritize sending a DNS query request set locally by the terminal, an address indicated by the DNS query request set locally by the terminal is an DNS address set locally by the terminal. In response to determining a difference between the address indicated by the DNS query request and the address indicated by the IP address information of the second network function, which is sent from the first network function to the terminal, the first network function executes an operation, such as DNS update reporting or DNS query request redirection, based on the predetermined information.

In an embodiment, the first network function can obtain the policy decision of the terminal. If the policy decision is the first decision, which instructs the terminal to prioritize sending a DNS query request provided by the first network function, an address indicated by the DNS query request provided by the first network function is an address of the second network function. In response to determining the address indicated by the DNS query request, which is determined by the first network function, being identical with the address indicated by the IP address information of the second network function, which is sent from the first network function to the terminal, the first network function does not execute the DNS update reporting operation or the DNS query request redirection operation.

It is to be noted that a person skilled in the art may understand that a method provided by the embodiment(s) of the present disclosure may be executed alone or together with method(s) in the embodiment(s) of the present disclosure or method(s) in the related art.

Figure 12:
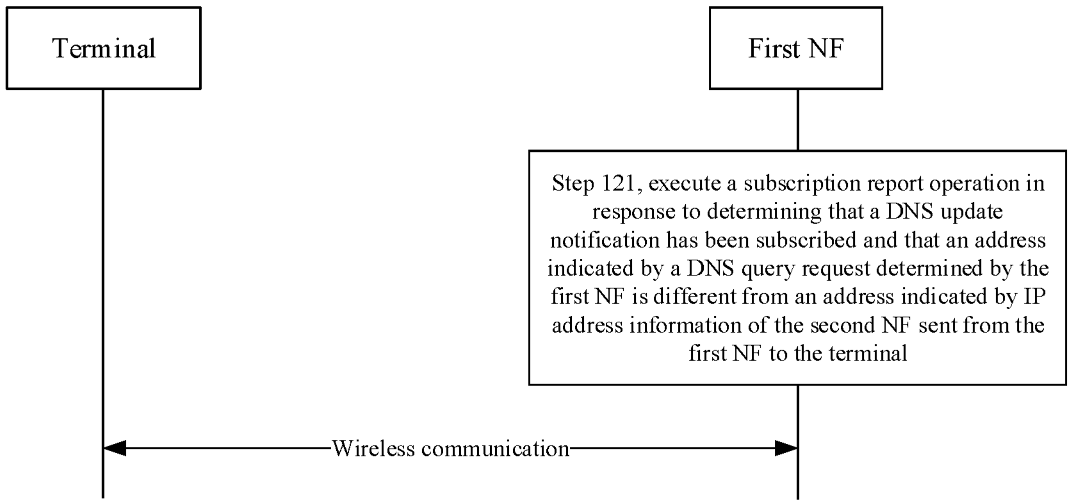
FIG. 12 is a flowchart of a route selection method for an EAS according to an exemplary embodiment.

As shown in FIG. 12, a route selection method for an EAS is provided in this embodiment, where the method is performed by a first network function, and the method includes the following.

At step 121, in response to determining that a DNS update notification has been subscribed and that an address indicated by a DNS query request determined by the first network function is different from an address indicated by IP address information of the second network function sent from the first network function to the terminal, a subscription report operation is executed.

In an embodiment, the DNS update notification is subscribed in advance. If the policy decision is the second decision, which instructs the terminal to prioritize sending a DNS query request set locally by the terminal, an address indicated by the DNS query request locally configured by the terminal is an DNS address locally configured by the terminal. In response to determining a difference between the address indicated by the DNS query request and the address indicated by the IP address information of the second network function sent from the first network function to the terminal, the subscription report operation is executed.

It should be noted, in an embodiment, the first network function can obtain the policy decision from the terminal. If the policy decision is the first decision, which instructs the terminal to prioritize sending a DNS query request provided by the first network function, an address indicated by the DNS query request provided by the first network function is an address of the second network function. In response to determining the address indicated by the DNS query request determined by the first network function being identical with the address indicated by the IP address information of the second network function sent from the first network function to the terminal, the subscription report operation is not executed.

It is to be noted that a person skilled in the art may understand that a method provided by the embodiment(s) of the present disclosure may be executed alone or together with method(s) in the embodiment(s) of the present disclosure or method(s) in the related art.

Figure 13:
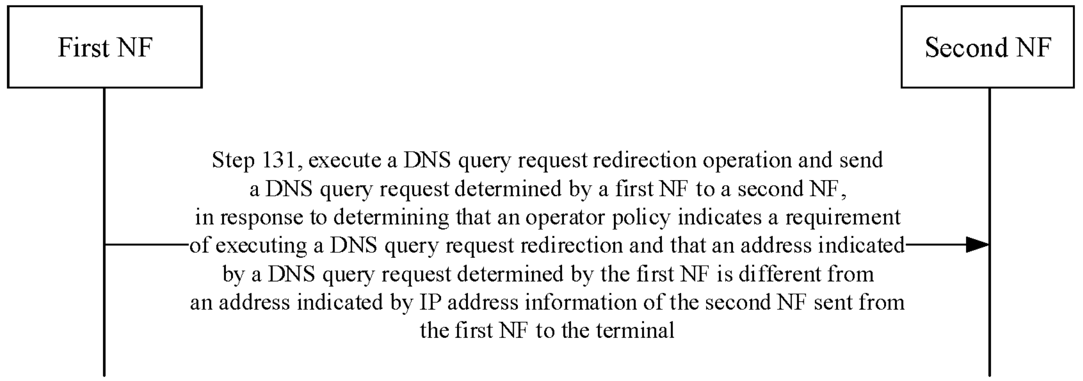
FIG. 13 is a flowchart of a route selection method for an EAS according to an exemplary embodiment.

As shown in FIG. 13, a route selection method for an EAS is provided in this embodiment, where the method is performed by a first network function, and the method includes the following.

At step 131, in response to determining that the operator policy indicates a requirement of executing a DNS query request redirection and that an address indicated by a DNS query request determined by the first network function is different from an address indicated by IP address information of the second network function sent from the first network function to the terminal, a DNS query request redirection operation is executed and a DNS query request determined by the first network function is sent to the second network function.

In an embodiment, the first network function can obtain the policy decision of the terminal. If the policy decision is the second decision, which instructs the terminal to prioritize sending a DNS query request set locally by the terminal, an address indicated by the DNS query request locally configured by the terminal is an DNS address locally configured by the terminal. In response to determining that the operator policy indicates a requirement of executing a DNS query request redirection and a difference between the address indicated by the DNS query request and the address indicated by the IP address information of the second network function sent from the first network function to the terminal, the DNS query request redirection operation is performed and the DNS query request is sent to the second network function determined by the first network function.

In an embodiment, the first network function can obtain the policy decisions from the terminal. If the policy decision is the first decision, which instructs the terminal to prioritize sending a DNS query request provided by the first network function, an address indicated by the DNS query request provided by the first network function is an address of the second network function. In response to determining that the operator policy indicates a requirement of executing a DNS query request redirection and that the address indicated by the DNS query request determined by the first network function is identical with the address indicated by the IP address information of the second network function sent from the first network function to the terminal, the DNS query request redirection operation is not performed.

It is to be noted that a person skilled in the art may understand that a method provided by the embodiment(s) of the present disclosure may be executed alone or together with method(s) in the embodiment(s) of the present disclosure or method(s) in the related art.

Figure 14:
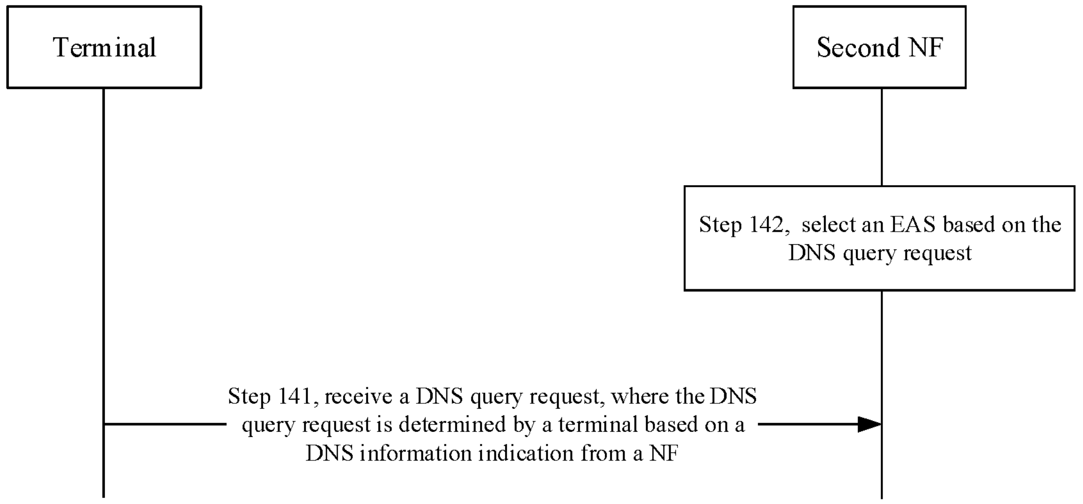
FIG. 14 is a flowchart of a route selection method for an EAS according to an exemplary embodiment.

As shown in FIG. 14, a route selection method for an EAS is provided in this embodiment, where the method is performed by a second network function, and the method includes the following.

At step 141, a DNS query request is received by the second network function, where the DNS query request is determined by a terminal based on a DNS information indication sent by a first network function.

At step 142, an EAS is selected based on the DNS query request.

The terminal may include, but is not limited to, a cell phone, a tablet, a wearable device, a vehicle terminal, a Road Side Unit (RSU), a smart home terminal, an industrial sensing device, a medical device, and the like. For example, the smart home terminal may include a camera, a temperature acquisition device, a brightness acquisition device, and the like.

The base station to which the present disclosure relates may include various types of base stations, such as, a base station of a third-generation mobile communication (3G) network, a base station of a fourth-generation mobile communication (4G) network, a base station of a fifth-generation mobile communication (5G) network, or other evolutionary base stations.

The core network device to which the present disclosure relates may include a Network Function (NF) entity or the like. For example, it may be a Session Management Function (SMF), an Access and Mobility Management Function (AMF), etc. The first network function may be the SMF and the second network function may be the EASDF.

In some embodiments, executing the DNS policy decision may include: determining to prioritize a transmission of a DNS query request provided by the first network function, where an address indicated by the DNS query request provided by the first network function is an address of the second network function; determining to prioritize a transmission of a DNS query request locally configured by the terminal, where an address indicated by the DNS query request locally configured by the terminal is a DNS address locally configured by the terminal; or determining a transmission of a self-determined DNS query request, where the DNS query request includes the DNS query request provided by the first network function or the DNS query request locally configured by the terminal.

In an embodiment, the DNS information indication sent by the first network function is received, where the DNS information indication includes an indication that a created PDU session is a specific service session of an edge computing type. The DNS policy decision is executed based on the DNS information indication, so as to determine to prioritize the transmission of the DNS query request provided by the first network function, where the address indicated by the DNS query request provided by the first network function is the address of the second network function. The DNS query request provided by the first network function is sent to the second network function, where the DNS query request is used to request the second network function to select an EAS. The second network function receives the DNS query request provided by the first network function, and selects an EAS based on the DNS query request.

In an embodiment, the DNS information indication sent by the first network function is received, where the DNS information indication includes an indication that a created PDU session is a specific service session of an edge computing type. The DNS policy decision is executed based on the DNS information indication, so as to determine to prioritize the transmission of the DNS query request set locally by the terminal, where the address indicated by the DNS query request set locally by the terminal is the DNS address set locally by the terminal. The DNS query request locally configured by the terminal is sent to the second network function, where the DNS query request is used to request the second network function to select an EAS. The second network function receives the DNS query request locally configured by the terminal, and selects an EAS based on the DNS query request.

In an embodiment, the DNS information indication from the first network function is received, where the DNS information indication includes an indication that a created PDU session is a specific service session of an edge computing type. The DNS policy decision is executed based on the DNS information indication, so as to determine the transmission of the self-determined DNS query request, where the DNS query request includes the DNS query request provided by the first network function or the DNS query request locally set by the terminal. One of the above two DNS query requests may be randomly selected to be sent to the second network function, where the DNS query request is used to request the second network function to select an EAS. The second network function receives the DNS query request, and selects an EAS based on the DNS query request.

In an embodiment, the DNS information indication from the first network function is received, where the DNS information indication includes an indication that a created PDU session is a specific service session of an edge computing type. The DNS policy decision is executed based on the DNS information indication, so as to determine the transmission of the self-determined DNS query request, where the DNS query request includes the DNS query request provided by the first network function or the DNS query request locally set by the terminal. One of the above two DNS query requests may be randomly selected to be sent to the second network function, where the DNS query request is used to request the second network function to select an EAS. The second network function receives the DNS query request, and selects an EAS based on the DNS query request.

In an embodiment, the DNS information indication includes a Data Network Name (DNN) and a network slice type, then the terminal may determine whether the PDU session is the specific service session of the edge computing type based on the DNN and the network slice type.

In an embodiment, the DNS information indication and IP address information of the second network function, which are sent by the first network function, are received. The DNS policy decision is executed based on the DNS information indication. Based on the decision, a DNS query request is sent to a second network function indicated by the IP address information, where the DNS query request is used to request the second network function to select an EAS. The second network function receives the DNS query request, and selects an EAS based on the DNS query request.

In an embodiment, the IP address information may be carried in a PDU session establishment accept message. It is noted that both the DNS information indication and the IP address information may be carried in the PDU session establishment accept message. After receiving the IP address information, the terminal may configure the second network function indicated by the address information as a DNS server or a proxy DNS server for the PDU session.

In an embodiment, IP address information of the second network function sent by the first network function is received. The IP address information is sent to an upper layer application or service of the terminal. The upper layer application or service performs a DNS policy decision based on the DNS information indication, and determines a DNS query request. The determined DNS query request is sent to the second network function indicated by the IP address information. The second network function receives the DNS query request, and selects an EAS based on the DNS query request.

To further understand embodiments of the present disclosure, the following illustrates the present disclosure solution by means of an exemplary example.

Example 1

Figure 15:
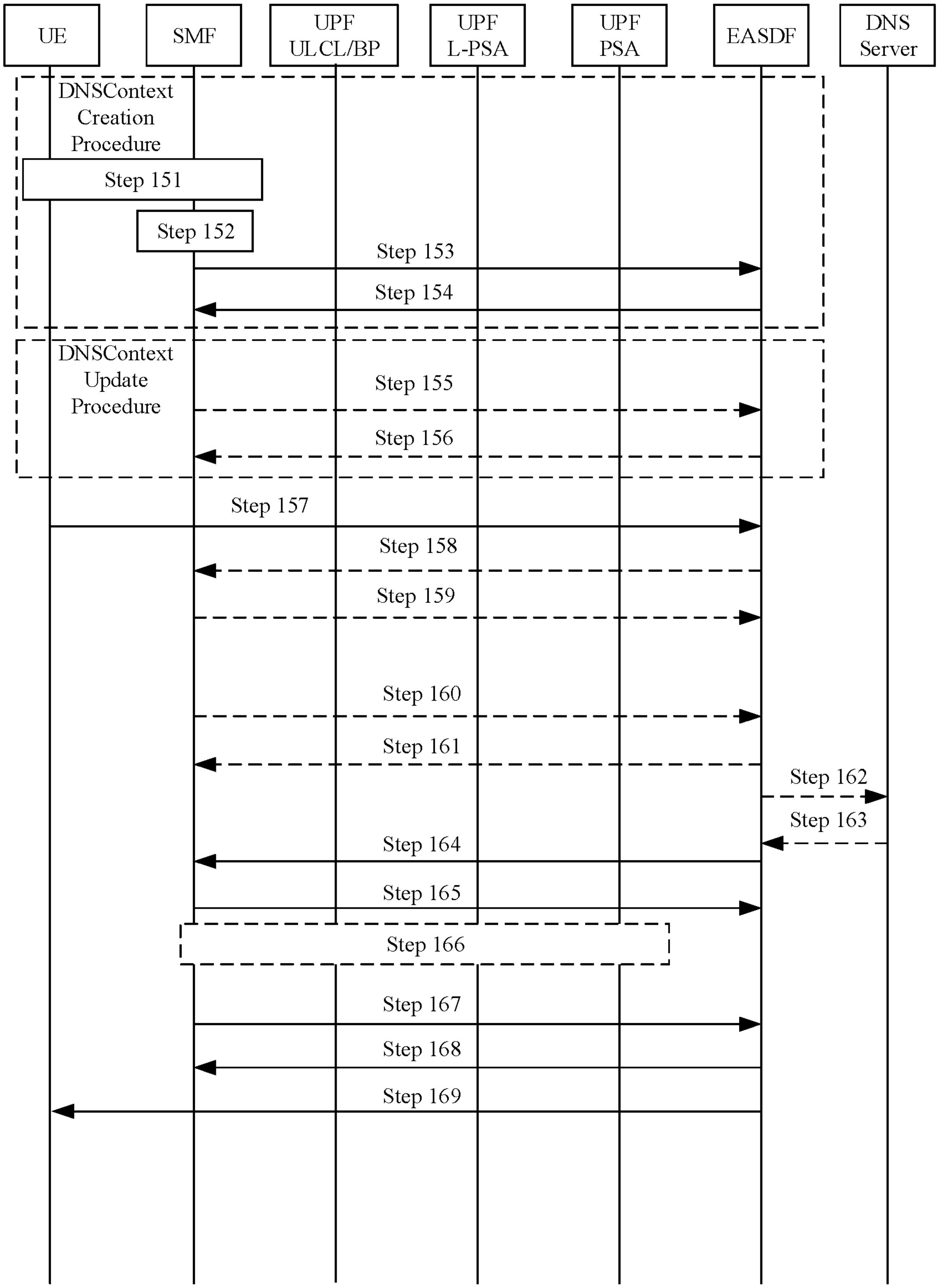
FIG. 15 is a flowchart of a route selection method for an EAS according to an exemplary embodiment.

As shown in FIG. 15, a route selection method for an EAS is provided in this embodiment, and the method includes the following.

At step 151, during a process of establishing a PDU session, a terminal (UE) sends a PDU session establishment request to an SMF (corresponding to a first network function).

At step 152, during the process of establishing the PDU session, the SMF selects an EASDF (corresponding to a second network function) based on EAS deployment information. The SMF may obtain the EAS deployment information through a policy related to a PCF PDU session, or may determine the EAS deployment information based on the UE contracted pre-configuration. If the SMF determines, based on a local configuration, that interaction between the EASDF in a DN and a DNS server needs to be carried out through a PSA UPF, the SMF configures the PSA UPF within a N4 rule, and forwards DNS message(s) between the EASDF and the DNS.

At step 153, the SMF sends the selected EASDF a Neasdf_DNSContext_Create Request message carrying information such as a UE IP address, a SUPI, a DNN, a notification endpoint, and a DNS message processing rule.

After completing step 153, the SMF carries an EASDF IP address as an address of the DNS server in a PDU session establishment accept message, and sends the message to the UE. The UE configures the EASDF as the DNS server for this PDU session. To guarantee that the EASDF IP address provided by the SMF is applied to subsequent UE DNS queries, in the PDU session creation establishment message, the SMF carries a DNS information indication of this DNS information to the UE, in addition to carrying the EASDF IP address as a DNS server to the UE. This DNS information indication includes any of the following: a network slice identifier or type (of a particular type of a network slice), a data network name, a combination of the DNN and a network slice application identifier, a service characteristic and a regional location corresponding to the network slice and the network name. The network slice type is determined based on the service characteristics of the edge computing related applications.

At step 154, the EASDF creates a DNS context for the PDU session, and stores the UE IP address, the SUPI, the notification endpoint, and the DNS message processing rule that may be provided in the context. The EASDF invokes a service operation, and sends a Neasdf_DNSContext_Create Response message to the SMF.

At step 155, the SMF may invoke Neasdf_DNSContext_Update Request to EASDF for the EASDF context ID and the DNS message processing rule. A triggering condition for the update process includes: the UE moving to a new location, an FQDN EASDF DNS query reporting by the EASDF, or an update of the DNS processing rule which is resulted by Local PSA insertion/deletion.

At step 156, the EASDF responds as the Neasdf_DNS-Context_Update Response, and sends an update response message to the SMF.

At step 157, the UE sends a DNS query message (corresponding to a DNS query request) to the EASDF.

The UE receives in advance the EASDF address and a priority indication of DNS information provided by the SMF, makes a DNS policy decision based on the priority indication, sends a DNS query message to the EASDF, and performs the discovery or selection for an edge application server.

The DNS policy decision of the UE includes any of the following: prioritizing an execution of the DNS query request provided by the SMF; prioritizing an execution of the DNS query request set locally by the UE; and the UE may decide on its own the execution policy of the DNS request (selecting the EASDF address provided by the SMF or a DNS address set locally by the UE). In this embodiment, the UE DNS policy decision is EASDF prioritized if the network slice type and/or network access name indicates that the PDU session is a specific service session of an edge computing type.

The UE further includes a DNS client function, supporting one or more of the following functions: receiving an EASDF address from the SMF, or sending a DNS query request to the EASDF address provided by the SMF. Specifically, the EASDF address received from the SMF may be sent to an upper layer application or service in the UE, and the DNS query request received from the upper layer application or service in the UE may be sent to the EASDF address provided by the SMF.

The DNS client function of the UE may be implemented by an application layer interface of the UE, or may be implemented by an operating system of the UE, or may be implemented in hardware of the UE. When the DNS client function of the UE is realized in the UE hardware, the method is realized and supported by both the hardware and the operating system.

At step 158, if the query message meets a processing rule for DNS message reporting, the EASDF reports the DNS packet(s) to the SMF by calling Neasdf_DNSContext_Notify Request.

The SMF obtains the execution policy (corresponding to the DNS decision policy) of the UE DNS query request and determines whether the EASDF address provided by the SMF or the DNS address set by the UE itself is used when the UE sends the DNS query request to the network. The SMF performs reporting or redirection based on an operator policy. The operator policy includes that, when the SMF determines a destination address of the DNS query request is not the EASDF address provided from the SMF to the UE, the SMF performs DNS update reporting or DNS query request redirection based on one or more kinds of information, such as network status, DNS priority, and service characteristics.

In an embodiment, if a DNS update notification is subscribed (e.g., the destination address of the DNS query request is not the EASDF address provided to the UE by the SMF), when the SMF detects that the destination address of the DNS query request is not the EASDF address provided to the UE by the SMF, the SMF performs subscription reporting.

In an embodiment, if the operator policy requires performing DNS query request redirection, when the SMF detects a DNS update (e.g., the DNS query request destination address is not the EASDF address provided by the SMF to the UE), the SMF performs the DNS query request redirection, and sends the DNS query request to an EASDF address selected by the SMF.

At step 159, the SMF performs a response, such as Neasdf_DNSContext_Notify Response, and sends the response message to the EASDF.

At step 160, the SMF invokes Neasdf_DNSContext_Update Request for a DNS message processing rule to the EASDF, if a DNS message processing rule for the FQDN received in a report needs to be updated, e.g., providing update information to construct EDNS Client Subnet option information. For option A, the DNS processing rule includes a corresponding IP address used to construct the EDNS client subnet option. For option B, the DNS processing rule includes a corresponding "local DNS server IP address". The DNS processing rule can also instruct EASDF to simply forward the DNS query to a pre-configured DNS server/resolver.

If a Fully Qualified Domain Name (FQDN) in the DNS query matches an FQDN provided by the SMF, the EASDF will execute one of the following options according to the SMF instruction.

1) Option A: the EASDF includes the EDNS Client Subnet option in a DNS query request message, and sends the DNS query request message to a DNS server for resolving the FQDN. The DNS server resolves the EAS IP address in conjunction with the EDNS Client Subnet option and sends a DNS response to the EASDF.
2) Option B: the EASDF sends a DNS query message to a local DNS server, which is responsible for resolving the FQDN in a corresponding L-DN. The EASDF receives a corresponding DNS Response message from the local DNS server.

At step 161, the EASDF performs a response, such as the Neasdf_DNSContext_Update Response, and sends the response message to the SMF.

At step 162, the EASDF processes the DNS query message received from the UE as follows: for option A, the EASDF adds the EDNS Client Subnet option to the DNS query message and sends the message to a C-DNS server; and for option B, the EASDF sends the DNS Query message to the local DNS server.

If there is no DNS message detection template in the DNS message processing rule provided by the SMF that matches the FQDN requested in the DNS Query, the EASDF can send the DNS Query directly to the pre-configured DNS server/resolver.

At step 163, the EASDF receives the DNS Response from the DNS system, and determines whether it can be sent to the UE.

At step 164, if the IP address of the EAS or the FQDN in the DNS Response message matches a reporting condition provided by the SMF, the EASDF may send a DNS message, which includes the EAS information, to the SMF by calling the Neasdf_DNSContext_Notify request. Multiple EAS IP addresses may be included in the DNS packet reporting if the EASDF receives multiple EAS IP addresses from contacted DNS server(s). The DNS message report may include the FQDN and EDNS Client Subnet option received in the DNS response message.

It is also possible that a DNS message processing rule is received. The EASDF buffers the DNS Response message first until it receives a notification from the SMF, and then sends it to the UE. If the buffering and reporting of the DNS Response message is requested, and a single report control is set, the EASDF performs a single report to the SMF when the EASDF detects a match in the DNS message detection template.

At step 165, the SMF invokes the Neasdf_DNSContext_Notify to response the service operation.

At step 166, the SMF optionally performs selection and insertion for an uplink classifier or local session anchor UPF, selects and inserts UL CL/BP and Local PSA. Based on EAS information received from the EASDF, other UPF selection criteria, and service experience or performance analysis of an edge application, the SMF may determine the DNAI and determine DNAS-related N6 data route information. The SMF optionally performs UL CL/BP and Local PSA selection and insertion. In the UL CL case, the SMF determines traffic detection rule(s) and data route rule(s) based on an IP address range for each DNAI.

At step 167, the SMF invokes Neasdf_DNSContext_Update Request to send a request message to the EASDF, the request carries a DNS message processing rule. The DNS message processing rules instruct the EASDF to send a buffered DNS response message to the UE.

At step 168, the EASDF performs a response, such as the Neasdf_DNSContext_Update Response, and sends the response message to the SMF.

At step 169, the EASDF sends the DNS response message to the UE.

Figure 16:
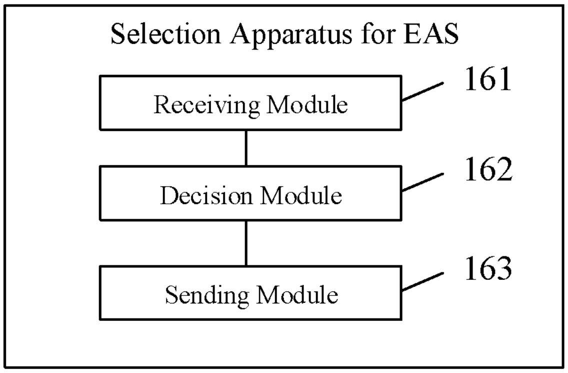
FIG. 16 is a schematic diagram of a route selection apparatus for an EAS according to an exemplary embodiment.

As shown in FIG. 16, a route selection apparatus for an EAS is provided in this embodiment, and the apparatus includes the following.

Receiving module 161 is configured to receive a Domain Name System (DNS) information indication sent by a first network function. Decision module 162 is configured to execute a DNS policy decision based on the DNS information indication, so as to obtain the decision.

Sending module 163 is configured to send a DNS query request to a second network function based on the decision, wherein the DNS query request is used to request the second network function to select an EAS.

It is to be noted that a person skilled in the art may understand that a method provided by the embodiment(s) of the present disclosure may be executed alone or together with method(s) in the embodiment(s) of the present disclosure or method(s) in the related art.

Figure 17:
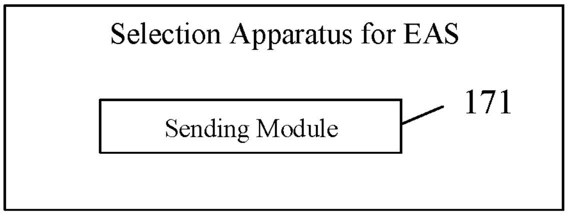
FIG. 17 is a schematic diagram of a route selection apparatus for an EAS according to an exemplary embodiment.

As shown in FIG. 17, a route selection apparatus for an EAS is provided in this embodiment, and the apparatus includes the following.

Sending module 171 is configured to send a DNS information indication to a terminal, wherein the DNS information indication is used for the terminal to execute a DNS policy decision, and the decision is used to determine a DNS query request requesting a second network function to select an EAS It is to be noted that a person skilled in the art may understand that a method provided by the embodiment(s) of the present disclosure may be executed alone or together with method(s) in the embodiment(s) of the present disclosure or method(s) in the related art.

Figure 18:
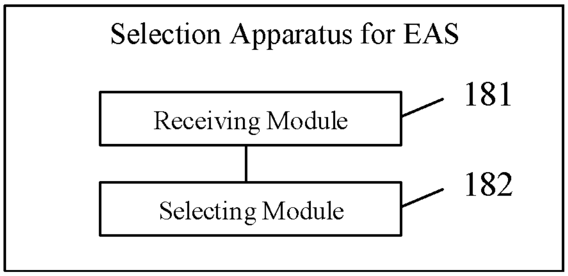
FIG. 18 is a schematic diagram of a route selection apparatus for an EAS according to an exemplary embodiment.

As shown in FIG. 18, a route selection apparatus for an EAS is provided in this embodiment, and the apparatus includes the following.

Receiving module 181 is configured to receive a DNS query request, wherein the DNS query request is determined by a terminal based on a DNS information indication sent by a network function; and Selecting module 182 is configured to select an EAS based on the DNS query request.

It is to be noted that a person skilled in the art may understand that a method provided by the embodiment(s) of the present disclosure may be executed alone or together with method(s) in the embodiment(s) of the present disclosure or method(s) in the related art.

An embodiment of the present disclosure provides a communication device, which includes:

a processor, and a memory, configured to store processor-executable instructions; where the processor is configured to implement the method applied to any embodiment of the present disclosure when the executable instructions are executed.

The processor may include various types of storage media, which are non-transitory computer storage media, and can continue to remember the information stored on the communication device after the communication device is powered down.

The processor may be connected to the memory via a bus, etc., configured to read an executable program stored on the memory.

An embodiment of the present disclosure further provides a computer storage medium, where the computer storage medium stores a computer executable program, and the executable program, when executed by a processor, realizes the method of any embodiment of the present disclosure.

Specific manners for devices in the apparatus in the foregoing embodiment to perform operations have been described in detail in the embodiments of the method. Details are not described herein again.

Figure 19:
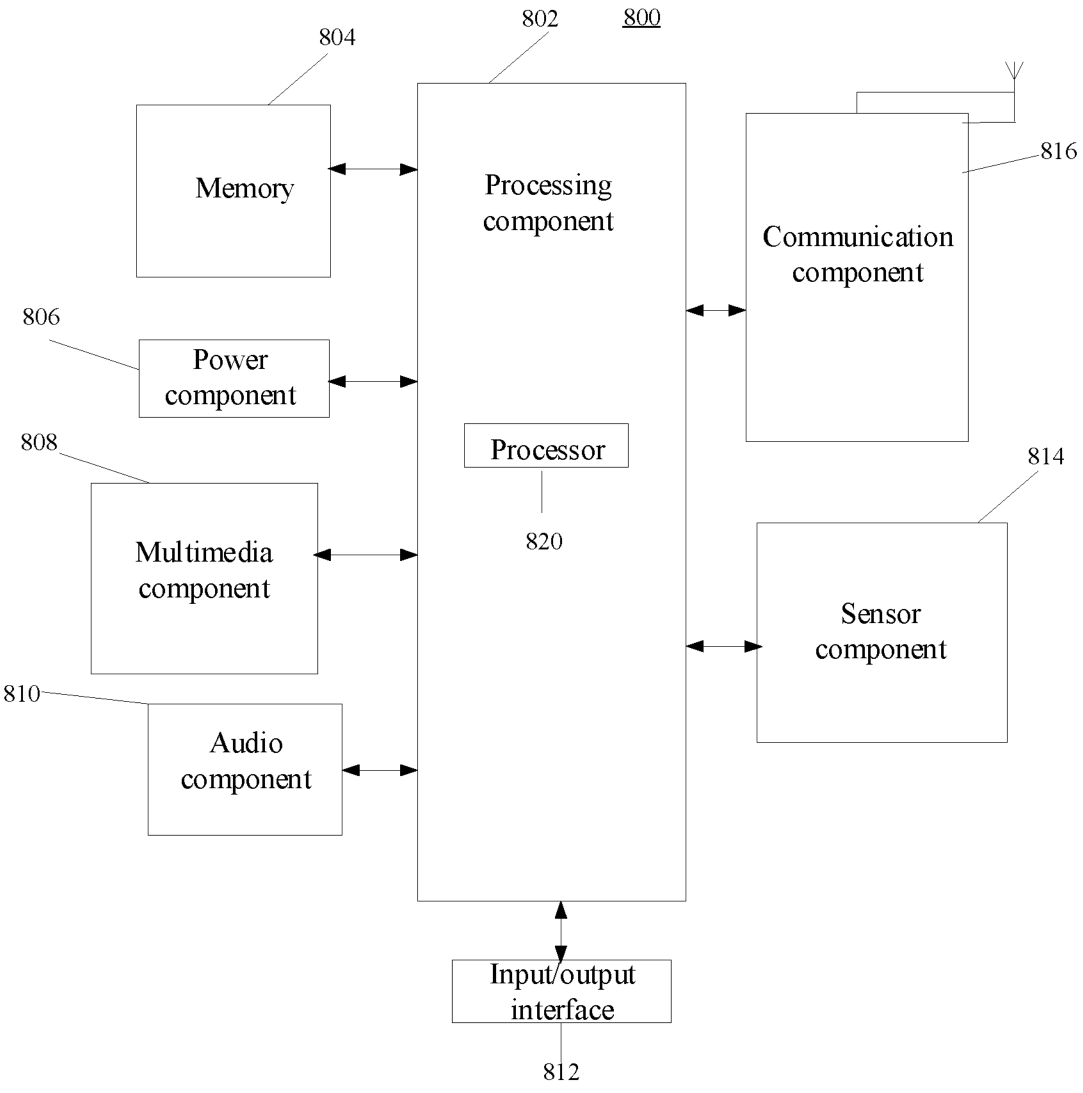
FIG. 19 is a block diagram of a terminal according to an exemplary embodiment.

As shown in FIG. 19, an embodiment of the present disclosure provides a structure of a terminal.

Referring to a terminal 800 shown in FIG. 19, this embodiment provides the terminal 800, which can specifically be a mobile phone, a computer, a digital broadcast terminal, a message transceiving device, a game console, a tablet device, a medical device, a fitness device and a personal digital assistant and so on.

As shown in FIG. 19, the terminal 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls overall operations of the terminal 800, such as operations associated with display, phone calls, data communications, camera operations, and recording operations. The processing assembly 802 may include one or more processors 820 to execute instructions to complete all or a part of the blocks of the above methods. In addition, the processing component 802 may include one or more modules which facilitate the interaction between the processing component 802 and other components. For example, the processing component 802 may include a multimedia module to facilitate the interaction between the multimedia component 808 and the processing component 802.

The memory 804 is configured to store different types of data to support operations at the apparatus 800. Examples of such data include instructions for any application or method operated on the terminal 800, contact data, phonebook data, messages, pictures, videos, and so on. The memory 804 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or optical disk.

The power supply component 806 supplies power for different components of the terminal 800. The power supply component 806 can include a power supply management system, one or more power supplies, and other components associated with generating, managing and distributing power for the terminal 800.

The multimedia component 808 includes a screen providing an output interface between the terminal 800 and a user. In some embodiments, the screen may include a liquid crystal display (LCD) and a touch panel (TP). If the screen includes the TP, the screen may be implemented as a touch screen to receive input signals from the user. The TP may include one or more touch sensors to sense touches, swipes, and gestures on the TP. The touch sensor may not only sense the boundary of a touch or slide operation but also detect duration and pressure relating to the touch or slide operation. In some examples, the multimedia component 808 may include a front camera and/or a rear camera. When the apparatus 800 is in an operation mode, such as a shooting mode or a video mode, the front camera and/or the rear camera may receive external multimedia data. Each of the front camera and the rear camera may be a fixed optical lens system or have focal length and optical zooming capability.

The audio component 810 is configured to output and/or input an audio signal. For example, the audio component 810 includes a microphone (MIC). When the terminal 800 is in an operation mode, such as a call mode, a record mode and a voice recognition mode, the microphone is configured to receive an external audio signal. The received audio signal may be further stored in the memory 804 or sent via the communication component 816. In some examples, the audio component 810 also includes a speaker for outputting an audio signal.

The I/O interface 812 may provide an interface between the processing component 802 and peripheral interface modules. The above peripheral interface modules may include a keyboard, a click wheel, buttons and so on. These buttons may include but not limited to, a home button, a volume button, a start button and a lock button.

The sensor component 814 includes one or more sensors to provide status assessments of various aspects for the terminal 800. For example, the sensor component 814 may detect an on/off state of the apparatus 800 and a relative location of components. For example, the components are a display and a keypad of the terminal 800. The sensor component 814 may also detect a position change of the terminal 800 or a component of the terminal 800, presence or absence of a touch of a user on the terminal 800, an orientation or acceleration/deceleration of the terminal 800, and a temperature change of terminal 800. The sensor component 814 may include a proximity sensor for detecting the existence of a nearby object without any physical touch. The sensor component 814 may also include a CMOS or CCD image sensor applied in an imaging application. In some examples, the sensor component 814 may also include an acceleration sensor, a gyro sensor, a magnetic sensor, a pressure sensor, or a temperature sensor.

The communication component 816 is to facilitate wired or wireless communication between the terminal 800 and other devices. The terminal 800 may access a wireless network based on a communication standard, such as WiFi, 2G or 3G, or a combination thereof. In examples, the communication component 816 receives a broadcast signal or broadcast related information from an external broadcast management system via a broadcast channel. In an exemplary embodiment, the communication assembly 816 may also include a Near Field Communication (NFC) module to facilitate short-range communications. For example, the NFC module may be implemented based on a radio frequency identification (RFID) technology, an infrared data association (IrDA) technology, an ultra wide band (UWB) technology, a Bluetooth (BT) technology, and other technologies.

In an exemplary embodiment, the terminal 800 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic elements, for executing the methods.

In an exemplary embodiment, a non-transitory computer readable storage medium including instructions, such as the memory 804 including instructions, is also provided. The above instructions may be executed by the processor 820 of the terminal 800 to complete the above method. For example, the non-transitory computer-readable storage medium may be a ROM, a RAM, a CD-ROM, a magnetic tape, a floppy disc, an optical data storage device, and the like.

Figure 20:
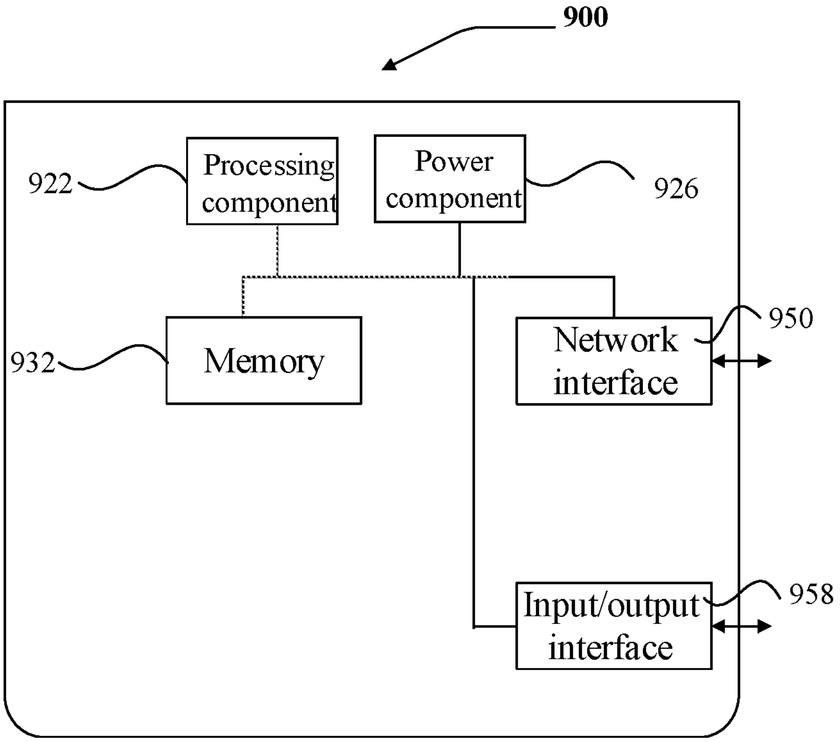
FIG. 20 is a block diagram of a base station to an exemplary embodiment.

As shown in FIG. 20, an embodiment of the present disclosure provides a structure of a base station. For example, a base station 900 may be provided as a network side device. Referring to FIG. 20, the base station 900 includes: a processing component 922, which further including one or more processors, and a memory resource represented by a memory 932, the memory resource being used for storing instructions that can be executed by a processing component 922, such as an application. The application stored in the storage medium 932 may include one or more modules, each of which corresponds to a set of instructions. In addition, the processing component 922 is configured to execute instructions to perform any of the aforementioned methods applied to the base station.

The base station 900 may further include: a power component 926, configured to manage power supply of the base station 900, a wired or wireless network interface 950, configured to connect the base station 900 to a network, and an input/output (I/O) interface 958. The base station 900 may operate based on an operating system, such as Windows Server™, Mac OS X™, Unix™, Linux™, FreeBSD™ or the like, stored in the memory 932.

Other embodiments of the present disclosure will be readily apparent to those skilled in the art after considering the specification and practicing the contents disclosed herein. The present disclosure is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims. It should be understood that the present disclosure is not limited to the precise structure described above and shown in the accompanying drawings, and various modifications and changes can be made without departing from the scope of the present specification. The scope of the present disclosure is limited only by the appended claims.

The invention claimed is:

1. A route selection method for an Edge Application Server (EAS), performed by a system comprising a terminal and a first network function, the method comprising:

sending, by the first network function, a Domain Name System (DNS) information indication to the terminal;

receiving, by the terminal, the DNS information indication sent by the first network function;

executing, by the terminal, a DNS policy decision based on the DNS information indication; and sending, by the terminal, a DNS query request to a second network function based on the decision, wherein the DNS query request is used to request the second network function to select an EAS;

wherein the method further comprises:

obtaining, by the first network function, the policy decision; and executing, by the first network function, a DNS update reporting operation or a DNS query request redirection operation based on the policy decision and an operator policy;

wherein the operator policy comprises: in response to determining that an address indicated by a DNS query request determined by the first network function is different from an address indicated by IP address information of the second network function sent from the first network function to the terminal, executing the DNS update reporting operation or the DNS query request redirection operation based on predetermined information;

wherein the predetermined information comprises at least one of:

network status information;

DNS priority information; or service characteristic information.

2. The method according to claim 1, wherein the DNS information indication indicates at least one of:

a network slice identifier;

a network slice type, wherein the network slice type is a network slice type determined based on a characteristic of an edge computing application;

a Data Network Name (DNN);

a combined relationship between the DNN and the network slice identifier;

one or more service characteristics and/or one or more regional locations corresponding to the DNN; or one or more service characteristics and/or one or more regional locations corresponding to the network slice.

3. The method according to claim 1, wherein the policy decision comprises at least one of:

a first decision instructing the terminal to prioritize a transmission of a DNS query request provided by the first network function, wherein an address indicated by the DNS query request provided by the first network function is an address of the second network function;

a second decision instructing the terminal to prioritize a transmission of a DNS query request locally configured by the terminal, wherein an address indicated by the DNS query request locally configured by the terminal is a DNS address locally configured by the terminal; or a third decision instructing the terminal to send a self-determined DNS query request, wherein the DNS query request comprises the DNS query request provided by the first network function or the DNS query request locally configured by the terminal.

4. The method according to claim 1, further comprising: receiving, by the terminal, Internet Protocol (IP) address information of the second network function sent by the first network function, wherein the IP address information of the second network function indicates an IP address of the second network function.

5. The method according to claim 4, wherein receiving the IP address information of the second network function sent by the first network function comprises:

during a process of establishing a Packet Date Unit (PDU) session, receiving a PDU session establishment accept message carrying the IP address information;

wherein the IP address information of the second network function is determined by EAS deployment information.

6. The method according to claim 4, further comprising:

sending the IP address information to an upper layer application of the terminal; and receiving a DNS query request for the IP address information sent by the upper layer application;

wherein sending the DNS query request to the second network function comprises:

sending the DNS query request to the second network function indicated by the IP address information.

7. The method according to claim 1, further comprising: sending, by the first network function, Internet Protocol (IP) address information of the second network function determined by the first network function to the terminal, wherein the IP address information of the second network function indicates an IP address of the second network function.

8. The method according to claim 7, wherein sending the IP address information of the second network function determined by the first network function to the terminal comprises:

during a process of establishing a PDU session, sending a Packet Data Unit (PDU) session establishment accept message carrying the IP address information to the terminal.

9. The method according to claim 7, further comprising:

determining, by the first network function, the second network function based on EAS deployment information determined by a Policy Control Function (PCF) Packet Data Unit (PDU) session policy; or determining, by the first network function, the second network function based on pre-configured EAS deployment information contracted by the terminal.

10. The method according to claim 1, further comprising: in response to determining that a DNS update notification has been subscribed and that an address indicated by a DNS query request determined by the first network function is different from an address indicated by IP address information of the second network function sent from the first network function to the terminal, executing, by the first network function, a subscription report operation.

11. The method according to claim 1, further comprising: in response to determining that the operator policy indicates a requirement of executing DNS query request redirection and that an address indicated by a DNS query request determined by the first network function is different from an address indicated by IP address information of the second network function sent from the first network function to the terminal, executing, by the first network function, the DNS query request redirection operation and sending a DNS query request determined by the first network function to the second network function.

12. The method according to claim 1, wherein the system further comprises the second network function, the method further comprising:

receiving, by the second network function, the DNS query request, wherein the DNS query request is determined by the terminal based on the DNS information indication sent by the first network function; and selecting, by second network function, the EAS based on the DNS query request.

13. A communication device, comprising:

a memory; and a processor, connected to the memory, configured to execute computer-executable instructions stored on the memory, and capable of implementing the method according to claim 12.

14. A communication device, comprising:

a memory; and a processor, connected to the memory, configured to:

receive a Domain Name System (DNS) information indication sent by a first network function;

execute a DNS policy decision based on the DNS information indication; and send a DNS query request to a second network function based on the decision, wherein the DNS query request is used to request the second network function to select an Edge Application Server (EAS);

wherein after the policy decision is obtained by the first network function, the policy decision and an operator policy are used for the first network function to execute a DNS update reporting operation or a DNS query request redirection operation;

wherein the operator policy comprises: in response to determining that an address indicated by a DNS query request determined by the first network function is different from an address indicated by IP address information of the second network function sent from the first network function to the communication device, executing the DNS update reporting operation or the DNS query request redirection operation based on predetermined information;

wherein the predetermined information comprises at least one of:

network status information;

DNS priority information; or service characteristic information.

15. A communication device, comprising:

a memory; and a processor, connected to the memory, configured to:

send a Domain Name System (DNS) information indication to a terminal, wherein the DNS information indication is used for the terminal to execute a DNS policy decision, and the decision is used to determine a DNS query request requesting a second network function to select an Edge Application Server (EAS);

obtain the policy decision; and execute a DNS update reporting operation or a DNS query request redirection operation based on the policy decision and an operator policy;

wherein the operator policy comprises: in response to determining that an address indicated by a DNS query request determined by the communication device is different from an address indicated by IP address information of the second network function sent from the communication device to the terminal, executing the DNS update reporting operation or the DNS query request redirection operation based on predetermined information;

wherein the predetermined information comprises at least one of:

network status information;

DNS priority information; or service characteristic information.

* * * * *